(12) United States Patent
Ganor

(10) Patent No.: US 11,936,676 B2
(45) Date of Patent: *Mar. 19, 2024

(54) ENTERPRISE CYBER SECURITY RISK MANAGEMENT AND RESOURCE PLANNING

(71) Applicant: Ido Ganor, Ra'annana (IL)

(72) Inventor: Ido Ganor, Ra'annana (IL)

(73) Assignee: CISOTERIA LTD., Ra'anana (IL)

(*) Notice: Subject to any disclaimer, the term of this patent is extended or adjusted under 35 U.S.C. 154(b) by 179 days.

This patent is subject to a terminal disclaimer.

(21) Appl. No.: 17/364,997

(22) Filed: Jul. 1, 2021

(65) Prior Publication Data

US 2021/0329025 A1      Oct. 21, 2021

Related U.S. Application Data

(63) Continuation of application No. 16/015,524, filed on Jun. 22, 2018, now Pat. No. 11,057,417.
(Continued)

(51) Int. Cl.
*H04L 9/40*         (2022.01)
*G06F 3/04847*      (2022.01)
(Continued)

(52) U.S. Cl.
CPC ...... *H04L 63/1433* (2013.01); *G06F 3/04847* (2013.01); *G06Q 10/06315* (2013.01);
(Continued)

(58) Field of Classification Search
CPC . H04L 63/20; H04L 63/1433; H04L 63/1441; G06F 21/577
(Continued)

(56) References Cited

U.S. PATENT DOCUMENTS 8,516,594 B2 *  8/2013  Bennett .............. G06T 11/206
                                                  713/188
8,776,180 B2 *  7/2014  Kumar ................ G06F 21/564
                                                  713/157
(Continued)

FOREIGN PATENT DOCUMENTS

WO    WO-2013166126 A1 * 11/2013 ............. G06F 21/51

*Primary Examiner* — Samson B Lemma
(74) *Attorney, Agent, or Firm* — Snyder, Clark, Lesch & Chung, LLP

(57) ABSTRACT

A system includes a memory to store network-related security policies and procedures associated with an enterprise, a display and at least one device. The device is configured to monitor enterprise activity associated the enterprise's networked and determine, based on the enterprise activity, whether the enterprise is complying with the security policies and procedures. The device is also configured to calculate a risk exposure metric for an asset of the enterprise based on the enterprise activity and whether the enterprise is complying with the security policies and procedures, and output, to the display, a graphical user interface (GUI) identifying the risk exposure metric. The device may also be configured to receive, via the GUI, an input to initiate a change with respect to at least one of the enterprise's networked devices or initiate the generation of a plan to make a change to at least one of the networked devices.

22 Claims, 17 Drawing Sheets

Related U.S. Application Data

(60) Provisional application No. 62/523,944, filed on Jun. 23, 2017.

(51) Int. Cl.

| | | |
|---|---|---|
| *G06Q 10/0631* | (2023.01) | |
| *G06Q 10/0635* | (2023.01) | |
| *G06F 3/04842* | (2022.01) | |
| *G06F 21/57* | (2013.01) | |
| *G06Q 30/018* | (2023.01) | |
| *H04L 41/22* | (2022.01) | |

(52) U.S. Cl.
CPC ......... *G06Q 10/0635* (2013.01); *H04L 63/20* (2013.01); *G06F 3/04842* (2013.01); *G06F 21/577* (2013.01); *G06Q 30/018* (2013.01); *H04L 41/22* (2013.01); *H04L 63/1425* (2013.01); *H04L 63/1441* (2013.01)

(58) Field of Classification Search
USPC ...................................................... 726/1, 26
See application file for complete search history.

(56) References Cited

U.S. PATENT DOCUMENTS

| | | | | |
|---|---|---|---|---|
| 8,850,588 B2* | 9/2014 | Kumar | ................ | H04L 63/1425 |
| | | | | 726/25 |
| 8,990,948 B2* | 3/2015 | Kumar | .................... | G06F 21/51 |
| | | | | 709/224 |
| 9,092,616 B2* | 7/2015 | Kumar | .................. | G06F 21/564 |
| 9,954,883 B2* | 4/2018 | Ahuja | ................ | H04L 63/1433 |
| 10,708,291 B2* | 7/2020 | Findlay | ............... | H04L 63/1441 |
| 2004/0010709 A1* | 1/2004 | Baudoin | ................ | G06Q 40/08 |
| | | | | 726/1 |
| 2006/0136327 A1* | 6/2006 | You | ......................... | G06Q 40/03 |
| | | | | 707/999.201 |
| 2007/0067847 A1* | 3/2007 | Wiemer | ................ | G06F 21/577 |
| | | | | 726/25 |
| 2007/0180490 A1* | 8/2007 | Renzi | .................... | G06F 21/604 |
| | | | | 726/1 |
| 2008/0047016 A1* | 2/2008 | Spoonamore | .......... | G06Q 10/06 |
| | | | | 726/25 |
| 2008/0288330 A1* | 11/2008 | Hildebrand | ...... | G06Q 10/06398 |
| | | | | 705/7.42 |
| 2009/0024627 A1* | 1/2009 | King | ..................... | G06F 21/577 |
| | | | | 707/999.009 |
| 2010/0275263 A1* | 10/2010 | Bennett | ................. | G06F 21/577 |
| | | | | 345/589 |
| 2013/0325545 A1* | 12/2013 | Mordvinova | .......... | G06Q 10/06 |
| | | | | 705/7.28 |
| 2014/0137257 A1* | 5/2014 | Martinez | ............. | H04L 63/1433 |
| | | | | 726/25 |
| 2014/0218389 A1* | 8/2014 | Bennett | ................. | G06T 11/001 |
| | | | | 345/593 |
| 2016/0212168 A1* | 7/2016 | Dotan | .................... | H04L 63/102 |
| 2016/0248800 A1* | 8/2016 | Ng | ......................... | G06Q 40/06 |
| 2020/0329068 A1* | 10/2020 | Findlay | ............... | H04L 63/1433 |

\* cited by examiner

| 1 | 2 | 3 | 4 | 5 | 6 | 7 | 8 |
|---|---|---|---|---|---|---|---|
| SECURITY AWARENESS | EMAIL POLICY, BLOCK EXECUTABLE /MACRO FILES | WEB POLICY, BLOCK DOWNLOAD OF EXECUTABLE FILES | STRICT ENDPOINT HARDENING – DENY EXECUTION OF PS | HAVE INTERNAL FW/ HIPS BLOCK LATERAL MOVEMENT | ALLOW USAGE OF DOMAIN ADMIN.CRED. ONLY ON STRICT SECURED JUMPER SERVERS; | BOUNDARY FW CHECK DNS TRAFFIC AT APP LEVEL ALLOWING ONLY REAL DNS TRAFFIC | IMPLEMENT FILE INTEGRITY MONITORING ON SERVERS WITH INTERNET ACCESS |

| TOP 10 ASSETS | AVG EXPOSURE |
|---|---|
| HR DATA | 50% |
| IP | 70% |
| CONTRACTS | 35% |
| FINANCE DATA | 20% |
| CUSTOMER'S DBs | 30% |

ENTERPRISE CYBER SECURITY RISK MANAGEMENT AND RESOURCE PLANNING

RELATED APPLICATION

This patent application is a continuation of U.S. patent application Ser. No. 16/015,524 filed on Jun. 22, 2018, titled "Enterprise Cyber Security Risk Management and Resource Planning, which claims priority under 35 U.S.C. § 119 based on U.S. Provisional Patent Application No. 62/523,944 filed on Jun. 23, 2017, the disclosures of which are both hereby incorporated by reference herein in their entireties.

BACKGROUND INFORMATION

Enterprises are being exposed to an increasing number of cyber threats having increased sophistication and complexity, as well as being subjected to increased regulations and privacy laws/acts. Most enterprises are not equipped to handle such threats, regulations and privacy laws from a security risk management perspective. For example, enterprises typically suffer from the lack of a security infrastructure to manage and store information in a single or multiple authoritative locations/systems for managing cyber security. As a result, enterprises have become increasingly vulnerable to having their valuable company private information or customers' data exposed to outsiders and insiders with malicious intent. In addition, enterprises are often unaware of all of the threats to their assets and are typically unable to quantify their potential exposure to such threats. Moreover, enterprises are unable to measure the success or failure of their security infrastructure and investments in terms of reduced probability of successful attacks.

BRIEF DESCRIPTION OF THE DRAWINGS

FIGS. 6A-6D illustrate an exemplary attack scenario, mitigation-related issues and questions and technical responses for an enterprise in an exemplary implementation;

FIG. 9 illustrates another exemplary user interface in accordance with an exemplary implementation.

DETAILED DESCRIPTION OF PREFERRED EMBODIMENTS

Figure 1:
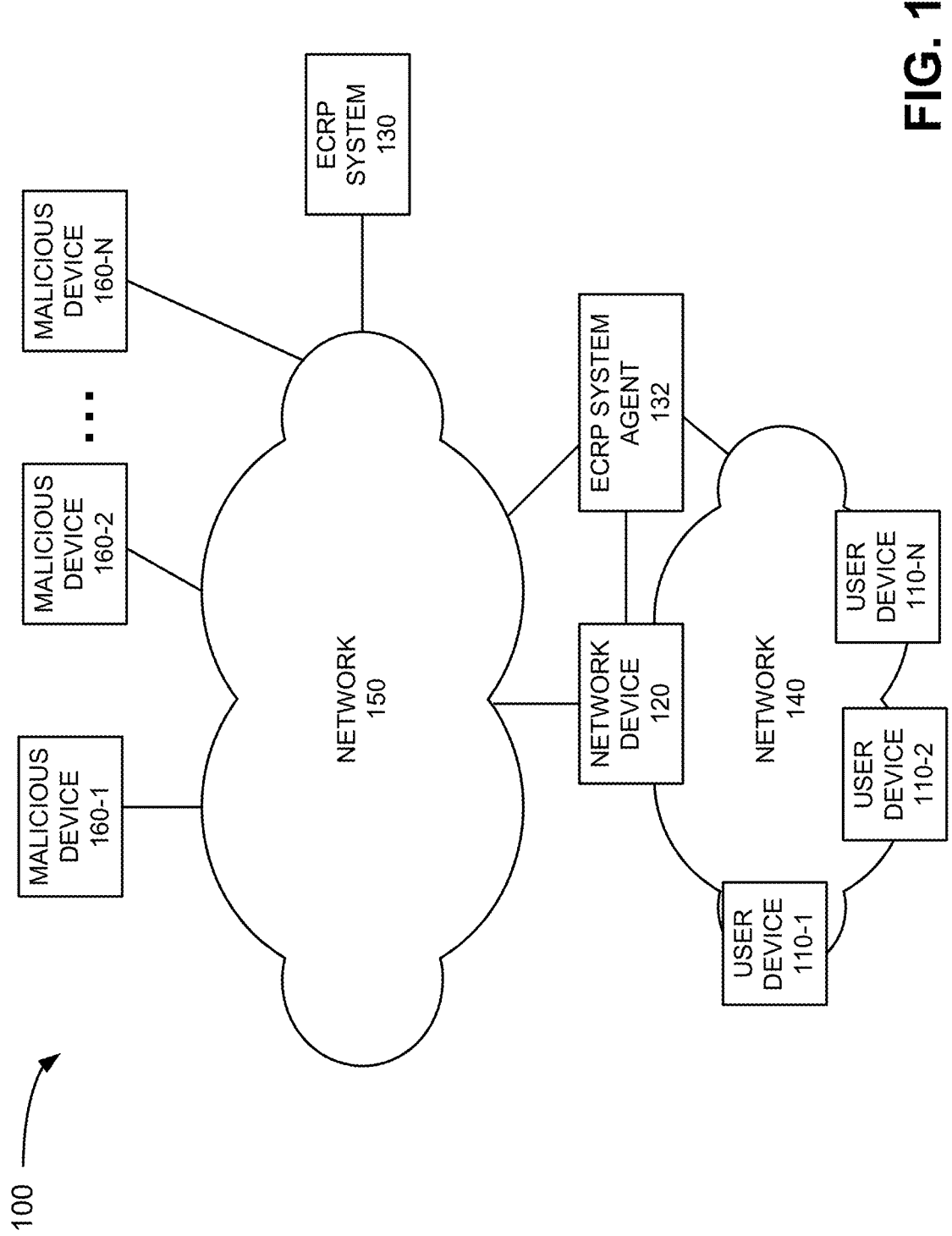
FIG. 1 illustrates an exemplary environment in which systems, devices and methods described herein may be implemented.

The following detailed description refers to the accompanying drawings. The same reference numbers in different drawings may identify the same or similar elements. Also, the following detailed description does not limit the invention. Instead, the scope of the invention is defined by the appended claims and their equivalents.

Implementations described herein provide methods, systems and computer program products for collecting and processing data from multiple sources and quantifying an exposure of a company's assets to various cyber threats and/or level of compliance with regulations and privacy laws. In one implementation, an enterprise cyber resource planning (ECRP) system provides a graphical user interface (GUI) to allow authorized personnel to view the exposure levels of a company's assets to particular cyber threats at a high, overall level and also at multiple levels of granularity (e.g., a threat level for each individual asset for each particular threat), as well as view the level of compliance with required regulations and privacy laws. The ECRP system may also generate an optimized cyber security work plan to reduce the risk exposure of a company's assets and/or increase the level of compliance with regulations and privacy laws.

For example, systems described herein, such as an ECRP system, generate an estimated risk exposure for a company/enterprise's assets based on the enterprise's security measures and display that risk exposure to a user. In one implementation, the user, via a workstation/client system, may request a cyber security work plan that will reduce the risk associated with the enterprise's assets. The system/server receives the user request, which may include identifiers associated with the assets and a desired exposure level for the assets. The system generates an optimized work plan based on the requested assets' exposure level. The system may also estimate resource expenditures, including manpower expenditures in terms of time and monetary expenditures which may include costs of new equipment, etc., to achieve the requested exposure level.

In exemplary implementations, the ECRP system (also referred to herein as "the system" or "the platform") provides a graphical user interface (GUI) that presents the estimated risk exposure to responsible information technology (IT) security personnel in a number of simplified manners that provide valuable cyber threat information regarding important enterprise assets. The GUI may also allow the security personnel to oversee and manage enterprise security from a single location/user interface and/or from multiple locations via multiple user interfaces. In addition, the system may generate recommendations regarding the deployment of resources and also initiate measures to mitigate the risk exposure. By aggregating data from multiple sources via a single platform or system of records, appropriate security personnel can define, manage and control all aspects of enterprise security management to minimize and/or prevent the exposure of company assets and to ensure that the enterprise is adhering to the security policies set by governing laws, privacy requirements and regulations and the enterprise's responsible security administrators.

The term "asset" as used herein should be construed to include any enterprise asset, including data or infrastructure elements/equipment. Data, for example, may include human resources (HR) data, costs of goods and/or services provided by an enterprise to customers, intellectual property, customer lists, personal information of employees and/or customers, etc. Infrastructure may include hardware and/or software, such as servers, routers, processors, communication links, interfaces, network devices, databases, applications, etc., owned or managed by the enterprise.

The term "enterprise" as used herein should be construed to include any entity, such as a small business/company, educational institution, governmental institution, large corporation, etc., in which employees' computers/workstations are interconnected via a network, such as a local area network (LAN), wide area network (WAN), the Internet, a public switched telephone network, etc. The enterprise may include multiple physical locations and multiple interconnected wired and wireless networks. The enterprise may also include suppliers and/or vendors that supply goods and/or services to the enterprise.

In one implementation, the ECRP system allows a responsible party (e.g., a Chief Information Security Officer (CISO), Chief (C)-level executives, such as the Chief Financial Officer (CFO), Chief Executive Officer (CEO), Data Protection Officer (DPO), Chief Risk Officer (CRO), Board members, a security manager or other party responsible for managing a company's security) to manage day-to-day activities, such as determine whether security policies/operations are being complied with, validate company compliance with regulations (e.g., ISO 27001, Payment Card Industry (PCI) standards, European General Data Protection Regulation (GDPR) standard, National Institute of Standards and Technology (NIST) standards, Center of Internet Security (CIS) standards, etc.), conduct audits and assessments and/or determine whether audits/assessments are being performed on a regular basis, perform and/or verify resource planning and prioritizing security tasks/activities, perform and/or verify security risk management procedures, administer and/or verify employee awareness programs are being followed, verify and/or audit security budgets, conduct and verify that security controls are being followed, provide access to a real-time cyber security user interface/dashboard, etc. In this manner, responsible parties (e.g., CISOs, C-level executives, security managers, etc.) may be able to obtain a partial or comprehensive end-to-end understanding of security issues, manage overall security operations with respect to security and mitigate risk, all from a single platform.

For example, in some implementations, a responsible party such as a CISO may elect to view only a portion of security issues for an enterprise, as opposed to a complete or comprehensive overview of enterprise security. In this situation, the CISO may select a particular user interface or dashboard associated with a particular security issue to verify that a security operational team is complying with the CISO's directives. In this manner, CISO may be able to quickly identify problem areas for intervention, such as when security policies are not being adequately complied with.

In implementations described herein, the system processes security related procedures and monitors enterprise activity in a real-time manner. For example, if a new threat outbreaks at external enterprises at any location around the world (e.g., a global virus or ransomware program zero-day attack) or internally at the enterprise and is detected by ECRP system 130, by enterprise personnel or automatically by an intrusion detection system (IDS) or any other means, the information can be input to the platform and the platform is able to recalculate threat levels and asset risk exposure in real-time or near real-time.

In addition, the system provides a number of GUIs to allow the responsible party to view risk exposure information associated with the enterprise's assets in real-time, or near real-time. The system described herein receives inputs associated with an enterprise, such as company rules/procedures for handling/communication data, email, etc., as well as information regarding the type of security, such as IDSs, intrusion prevention systems (IPSs), firewalls, etc., that the enterprise deploys. The platform/system may then calculate and/or predict an enterprise's assets' risk exposure based on the received data.

The system may also compare, using a profiling mechanism to identify characteristics of the company, such as size, line of business, etc., the assets' risk exposure to peers in the same general field of business/endeavor to allow the security personnel to obtain a more complete idea of areas where risk management needs to be improved, such as by deploying new network security resources, re-configuring existing network security resources and/or implementing new security controls and/or procedures. In one implementation, the risk exposure may be defined as a percentage value ranging from 0-100 percent, with zero percent corresponding to no risk or extremely low risk and 100 percent corresponding to a very high risk. In other implementations, the risk exposure may be defined in relative terms, such as very low, low, medium, high, very high, etc. In implementations described herein, the system may provide recommendations to mitigate the threats via a GUI and/or automatically initiate measures to mitigate the threat, such as automatically re-deploy network security equipment, deploy new security equipment (e.g., a firewall), send alerts/communications to the appropriate personnel, quarantine or block access to enterprise assets from all or particular user devices 110, etc. In some implementations, recommendations may or may not be generated for risk exposure determined to be "very low" or "low," and/or mitigating measures may be automatically initiated for risk exposure determined to be "high" or "very high."

Implementations described herein provide a technology-based solution, and logical-based solution, for equipping responsible parties, such as CISOs, C-level executives, etc., with critical operational knowledge for making cyber-related decisions with respect to an enterprise's network resources. The term "resources" as used herein should be construed to include hardware devices/systems, software devices/system, network assets, security devices, etc. The system described herein also provides for increased efficiency of powerful enterprise-wide tools for managing daily security operations, while optimizing security based on an enterprise's acceptable exposure level.

FIG. 1 is a block diagram of an exemplary environment 100 in which systems and methods described herein may be implemented. Environment 100 may include user devices 110-1 through 110-N, network device 120, enterprise cyber resource planning (ECRP) system 130, ERCP system agent 132, networks 140 and 150 and malicious devices 160-1 through 160-N. The elements illustrated as being associated/connected to network 140 (e.g., user devices 110-1 through 110-N, network device 120 and ECRP system agent 132) may represent a portion of an enterprise's devices and assets. The number of devices shown in FIG. 1 as being associated with network 140 is provided for simplicity. It should be understood that an enterprise may include thousands of devices that are part of the enterprise's assets. The terms "enterprise" and "company" are used interchangeably in the description below.

User devices 110-1 through 110-N (referred to individually as user device 110-x or 110 and collectively as user devices 110 may each include a mobile device, such as wireless or cellular telephone device (e.g., a conventional cell phone with data processing capabilities), a smart phone, a personal digital assistant (PDA) that can include a radiotelephone, etc. User devices 110 may also include any type of computer device or system, such as a personal computer (PC), a laptop, a tablet computer, a notebook, a netbook, a wearable computer (e.g., a wrist watch, eyeglasses, etc.), a game playing device, a music playing device, a television, a home appliance device, a home monitoring device, a camera, etc. User devices 110 may further include Internet of Things (IoT) devices or "smart" devices, such as sensors, actuators, home automation devices, etc., that may include communication functionality. For example, IoT devices may include machine type communication (MTC) devices that communicate wirelessly with other devices over a machine-to-machine (M2M) interface.

User devices 110 may also include other company devices/assets, such as a company email server, a printer or print server, firewalls (FWs), network access control (NAC) devices, intrusions detection systems (IDSs), intrusion prevention systems (IPSs), web/email filtering devices, devices running anti-virus software, databases storing a company's private information, such as contract information, intellectual property information, internal communications, human resources information, financial information, proprietary strategy information, etc.

User devices 110 may be part of a local area network (LAN) or wide area network (WAN), such as network 140 which may be an enterprise LAN or WAN associated with a business, corporation, educational institution, etc. User devices 110 may connect to network 140 and other devices in environment 100 (e.g., network device 120, ECRP system 130, ECRP system agent 132, network 150, etc.), via any conventional technique, such as wired, wireless, optical connections or a combination of these techniques. User device 110 and the person associated with user device 110 (e.g., the party holding or using user device 110, the owner of user device 110) may be referred to collectively as user device 110 in the description below.

Network device 120 may correspond to a broadband router or gateway device that acts as a gateway for devices connected via network 140 to communicate with external networks, such as network 150. Network device 120 may act as a hub for communications to/from an enterprise network 140. For example, network device 120 may act as a local router to route communications from user devices 110 to their appropriate destinations via networks 140 and/or 150 and receive communications from networks 140 and/or 150 and route the communications to the appropriate user device 110. Network device 120 may also include a firewall, an intrusion detection system and/or an intrusion prevention system to attempt to block cyber attacks.

ECRP system 130 (also referred to herein as system 130 or platform 130) may include one or more computing devices associated with managing enterprise security for an enterprise associated with network 140 and/or network 150. For example, ECRP system 130 may correspond to an enterprise security management (ESM) platform that allows security personnel (e.g., a CISO) to manage enterprise security and ensure that the enterprise is following company policies and procedures with respect to enterprise security. ECRP system 130 may also include cyber resource planning functionality to allow security personnel to easily manage and mitigate risks via a single platform.

For example, ECRP system 130 may allow security personnel to select portions of an enterprise's asset/system (e.g., on a granular level) to view in real-time, run reports, determine whether daily security operations are being performed, determine whether company security policies and/or security controls are being followed, etc., as described in detail below. ECRP system 130 may further provide a platform for collaboration between management personnel (e.g., a CISO) and/or various security operations teams.

ECRP system 130 may reside "in the cloud" (e.g., connected to other devices in environment 100 via network 150 and/or 140) and provided via a Software as a Service (SaaS) model to the enterprise associated with network 140, and/or other enterprises. In this implementation, ECRP system agent 132 includes a computer (e.g., laptop computer, personal computer, mobile computing device, etc.), workstation, or any device with communication functionality via which personnel at the enterprise can communicate with ECRP system 130 to obtain risk exposure, threat level, work plans, etc., as described in more detail below.

In one implementation, ECRP system 130 includes two main logical components or functional elements: 1) graphical user interfaces (GUIs) and all logic components/modules, databases, etc., supporting the GUIs, and 2) an agent coupled to enterprise network 140, such as ECRP system agent 132. ECRP system agent 132 is configured to connect to infrastructure on the enterprise, such as active directories, security devices and applications, a ticketing system (e.g., a trouble ticketing system to address problems), an enterprise resource planning (ERP) system, security scanning devices, etc. ECRP system agent 132 may also manage and run simulators that are aimed to probe/monitor security status of elements on the enterprise network to provide input data to ECRP engine/modules.

In an exemplary implementation, such simulations run by ECRP system 130 may include, for example:

1) Mail Attack Simulation—Defending Against Malicious E-Mails

The purpose of the mail attack simulation is to challenge the enterprise's e-mail security assumptions, such as whether the enterprise's current solutions are protecting the enterprise and to what degree. Running such a simulation allows enterprise personnel to identify what is actually protected or defended, as compared to what the enterprise personnel think is protected. In this simulation, ECRP system 130 tests e-mail security controls and/or enterprise e-mail policy by sending multiple types of e-mails simulating known, real attacks. ECRP system 130 determines which e-mails arrive in the mail boxes of, for example, user devices 110 to determine risk levels in the various scenarios.

2) Web Attack Simulation—Defending Against Malicious Websites

The purpose of the web attack simulation is to challenge the enterprise's browsing security assumptions, such as whether the enterprise's current solutions are protecting the enterprise and to what degree. This allows enterprise personnel to identify what is actually protected or defended, including identifying risk in various scenarios, as compared to what the enterprise personnel think is protected. In this simulation, ECRP system 130 tests the enterprise's browsing security controls and/or policies by simulating access to malicious websites, by downloading various types of files from the web, checking what happens with encrypted traffic, and non-standard traffic/ports, etc. ECRP system 130 determines which attacks succeed to determine risk levels in the various scenarios.

3) Data Leakage Simulation—Defending Against Data Leakage

The purpose of the data leakage simulation is to challenge the enterprise's data security assumptions, such as whether the enterprise's current solutions are protecting the enterprise and to what degree. This allows enterprise personnel to identify what is actually protected or defended, including identifying risk with respect to data leakage, as compared to what the enterprise personnel think is protected/defended.

4) Endpoint Attack Simulation

The purpose of the endpoint attack simulation is to challenge the enterprise's Endpoint security assumptions, such as whether the enterprise's current solutions and hardening configurations are protecting the Endpoint and network and to what degree. This allows enterprise personnel to identify what is actually protected, including identifying risk, as compared to what the enterprise personnel think is protected/defended. In this simulation, ECRP system 130 tests the enterprise's Endpoint security hardening and controls and policies that are in place by simulating possible lateral movements that can be performed by a hacker who has gained a foothold on the user's endpoint. ECRP system 130 determines risk levels in the various scenarios based on attacks that succeed.

5) Awareness Simulation

The purpose of the awareness simulation is to challenge the enterprise's user awareness assumptions, such as whether the enterprise's current state of awareness is as the enterprise assumes. In this simulation, ECRP system 130 chooses, for example, and based on the assumptions, a set of phishing email campaigns. ECRP system 130 executes the phishing campaigns and tracks the results.

6) Asset Segmentation Simulation

The purpose of the asset segmentation simulation is to test whether the assets are segmented in a way that reduces the chances of a breach. In this simulation, ECRP system 130 chooses particular enterprise assets and determines whether the assets are susceptible to discovery via a single breach as opposed to requiring several security breaches to obtain asset-related information.

Returning to FIG. 1, network 150 may include one or more wired, wireless and/or optical networks that are capable of receiving and transmitting data, voice and/or video signals. For example, as described above, network 150 may be associated with an Internet Service Provider (ISP) that provides Internet access to user devices 110 connected via network 140. In one implementation, network 150 may include one or more public switched telephone networks (PSTNs) or other type of switched network. Network 150 may also include one or more wireless networks and may include a number of transmission towers for receiving wireless signals and forwarding the wireless signals toward the intended destination. Network 150 may further include one or more satellite networks, one or more packet switched networks, such as an Internet protocol (IP) based network, a LAN, a WAN, a personal area network (PAN), a WiFi network, a Bluetooth network, an intranet, the Internet, or another type of network that is capable of transmitting data. Network 150 provide wireless packet-switched services and wireless Internet protocol (IP) connectivity to user devices 110 to provide, for example, data, voice, and/or multimedia services.

Malicious devices 160-1 through 160-N (referred to individually as malicious device 160-x or 160 and collectively as malicious devices 160) may include any type of device that may be involved in a cyber attack or an attempt to surreptitiously gain information associated with an enterprise via, for example, network 140. For example, malicious devices 160 may each include a mobile device, such as wireless or cellular telephone device (e.g., a conventional cell phone with data processing capabilities), a smart phone, a personal digital assistant (PDA) that can include a radiotelephone, any type of computer device or system, such as a personal computer (PC), a laptop, a tablet computer, a notebook, a netbook, a wearable computer (e.g., a wrist watch, eyeglasses, etc.), a game playing device, a music playing device, a television, a home appliance device, a home monitoring device, a camera, Internet of Things (IoT) devices or "smart" devices, such as sensors, actuators, home automation devices, etc., that may include communication functionality. In addition, in some instances, one or more of user devices 110 may act as a malicious device (e.g., be taken over by another entity in a botnet attack, be associated with a disgruntled employee, etc).

The exemplary configuration illustrated in FIG. 1 is provided for simplicity. It should be understood that a typical environment may include more or fewer devices than illustrated in FIG. 1. For example, as described above, environment 100 may include a large number (hundreds or more) of user devices 110, network devices 120, ECRP systems 130, ECRP system agents 132, networks 140 and 150 and malicious devices 160. In addition, environment 100 may include additional elements, such as eNodeBs, base stations, switches, gateways, routers, monitoring devices, etc., that aid in routing data/communications to user devices 110.

Various functions are described below as being performed by particular components in environment 100. In other implementations, various functions described as being performed by one device may be performed by another device or multiple other devices, and/or various functions described as being performed by multiple devices may be combined and performed by a single device. In addition, although networks 140 and 150 are shown as separate networks, in other implementations, these networks or portions of these networks may be included in a single network.

Figure 2:
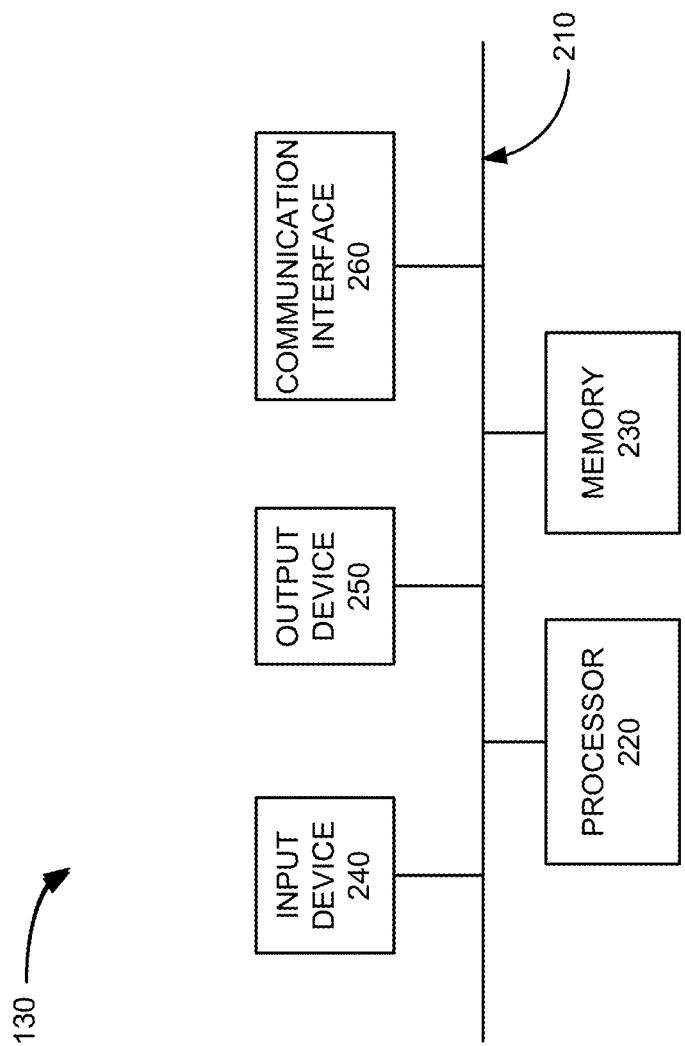
FIG. 2 illustrates an exemplary configuration of components implemented in one or more of the devices of FIG. 1.

FIG. 2 illustrates an exemplary configuration of ECRP system 130. Other devices in environment 100, such as user devices 110, network device 120, ECRP system agent 132 may be configured in a similar manner. Referring to FIG. 2, ECRP system 130 may include bus 210, processor 220, memory 230, input device 240, output device 250 and communication interface 260. Bus 210 may include a path that permits communication among the elements of system 130.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Input device 240 may also include mechanisms that permit input from other security platforms, such as Anti-Virus systems/platforms, Network Access Control (NAC) systems, Vulnerability scanners, Security Information and Event Management (SIEM) systems, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that system 130 (or other components in FIG. 1) uses to communicate with other devices via wired, wireless or optical mechanisms. For example, communication interface 260 may include one or more radio frequency (RF) transmitters, receivers and/or transceivers and one or more antennas for transmitting and receiving RF data via network 140 and/or 150. Communication interface 260 may also include a modem or an Ethernet interface to a LAN or other mechanisms for communicating with elements in a network, such as network 140 (e.g., user devices 110, network device 120, ECRP system agent 132) or another network.

The exemplary configuration illustrated in FIG. 2 is provided for simplicity. It should be understood that system 130 may include more or fewer devices than illustrated in FIG. 2. In an exemplary implementation, system 130 (or other device in environment 100, such as ECRP system agent 132) performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
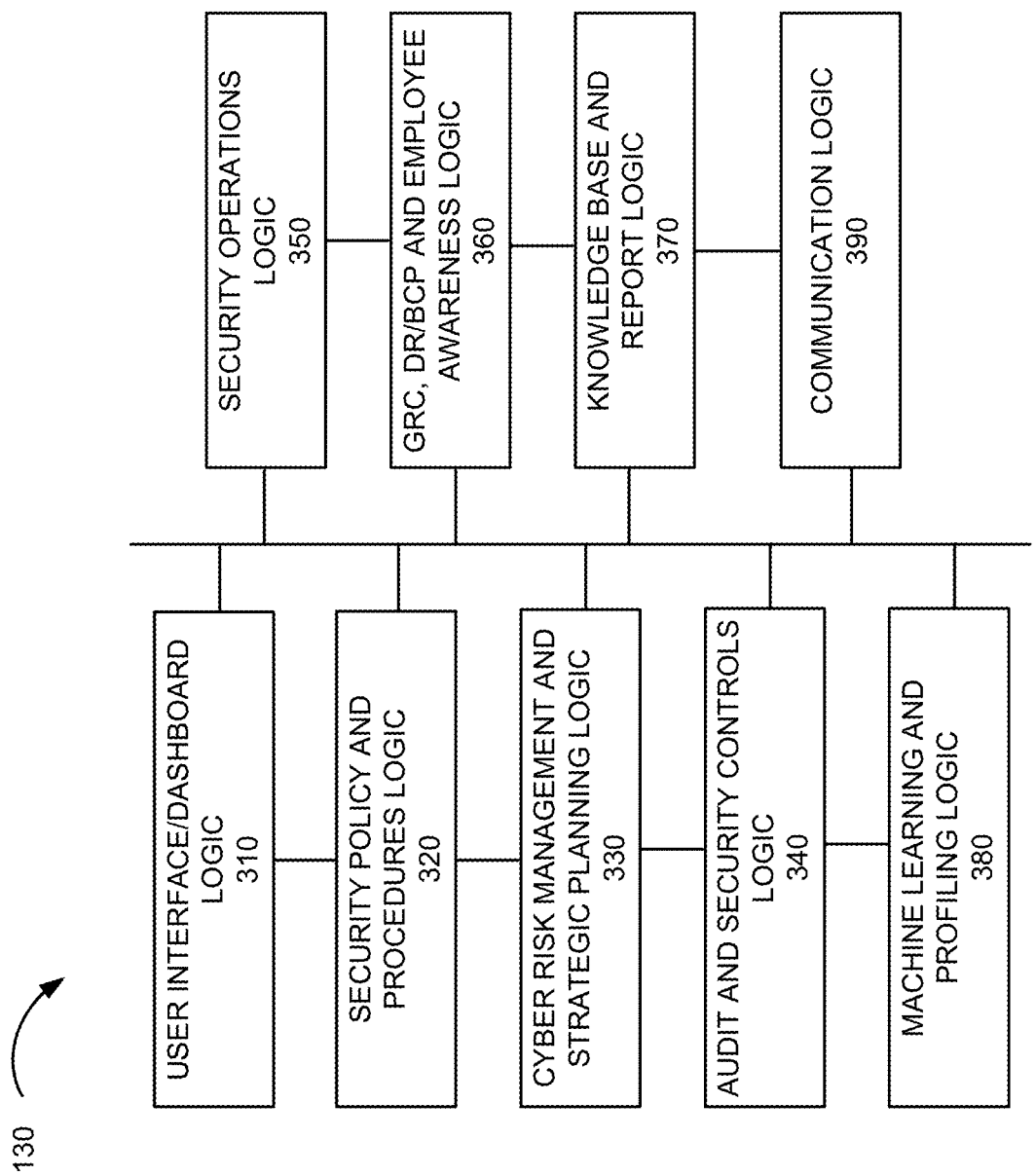
FIG. 3 illustrates an exemplary configuration of logic components included in one or more of the devices of FIG. 1.

FIG. 3 is an exemplary functional block diagram of logic components or modules implemented in ECRP system 130. In an exemplary implementation, all or some of the components illustrated in FIG. 3 may be implemented by processor 220 executing software instructions stored in memory 230.

Referring to FIG. 3, ECRP system 130 includes user interface/dashboard logic 310, security policy and procedures logic 320, cyber risk management and strategic planning logic 330, audit and security controls logic 340, security operations logic 350, governance, regulations and compliance (GRC) logic, disaster recovery (DR)/business continuity planning (BRP) logic and employee awareness logic 360, knowledge base and report logic 370, machine learning and profiling logic 380 and communication logic 390. In alternative implementations, these components or a portion of these components may be located externally with respect to ECRP system 130.

User interface logic 310 may include logic to allow a user (e.g., a CISO, network security manager, business owner, etc.) to view various aspects of an enterprise's security to determine compliance with an enterprise's security policies, regulations and privacy laws. For example, a CISO may wish to view information regarding whether the policies associated with security/protection of enterprise assets are being properly followed, view budgetary information regarding an enterprise's security budget (e.g., whether audits are being performed on time and within the allotted budget), view data/knowledge bases associated with enterprise security compliance, view statuses of current or past cyber threats and whether enterprise policies with respect to the handling of cyber threats has been performed in accordance with the enterprise's policies, etc. User interface logic 310 may also allow the CISO to input a search query regarding any of various security systems/devices in the enterprise, such as firewalls, network access control devices, anti-virus software, intrusion detections systems, etc., or assets in a company's enterprise network, and identify whether the responsible security personnel/teams are performing their tasks/functions in accordance with company policies/procedures to mitigate risk.

In some implementations, user interface logic 310 also allows appropriate security operations teams to input information regarding particular tasks/functions performed by the security operations teams. For example, if one security operations team has performed a monthly upgrade of software for user devices 110 (e.g., upgraded anti-virus software), that particular security operations team may access user interface logic 310 and input that information to system 130. As another example, if another security operations team has completed its segmentation of a network asset to limit access to that network asset, the security operations team may enter that information via user interface logic 310. In this manner, ECRP system 130 may allow for collaboration between security operations teams and security managers (e.g., a CISO). That is, once information is entered via user interface logic 310, a CISO may be aware of the tasks/functions performed by the various security teams. In other implementations, user interface logic 310 and other logic/modules illustrated in FIG. 3 may obtain information regarding security tasks/activities performed by various security operations teams associated with the enterprise from other devices/systems (not shown in FIG. 3) and process the information and make it available for the CISO or other management personnel.

As an example, assume that the enterprise follows a particular security standard (e.g., PCI standard) that requires use of a firewall to protect certain network assets, and requires that certain types of data within the enterprise be segmented to only allow authorized personnel to access the data. In this case, a CISO may search for information regarding firewall and network segmentation compliance to ensure that the enterprise is complying with the appropriate enterprise security standard. In such cases, a CISO may use a graphical user interface (GUI) or dashboard provided by user interface/dashboard logic 310 associated with firewalls and/or network segmentation and obtain information regarding whether the enterprise is in compliance with the particular security policy/standard.

Figure 4A:
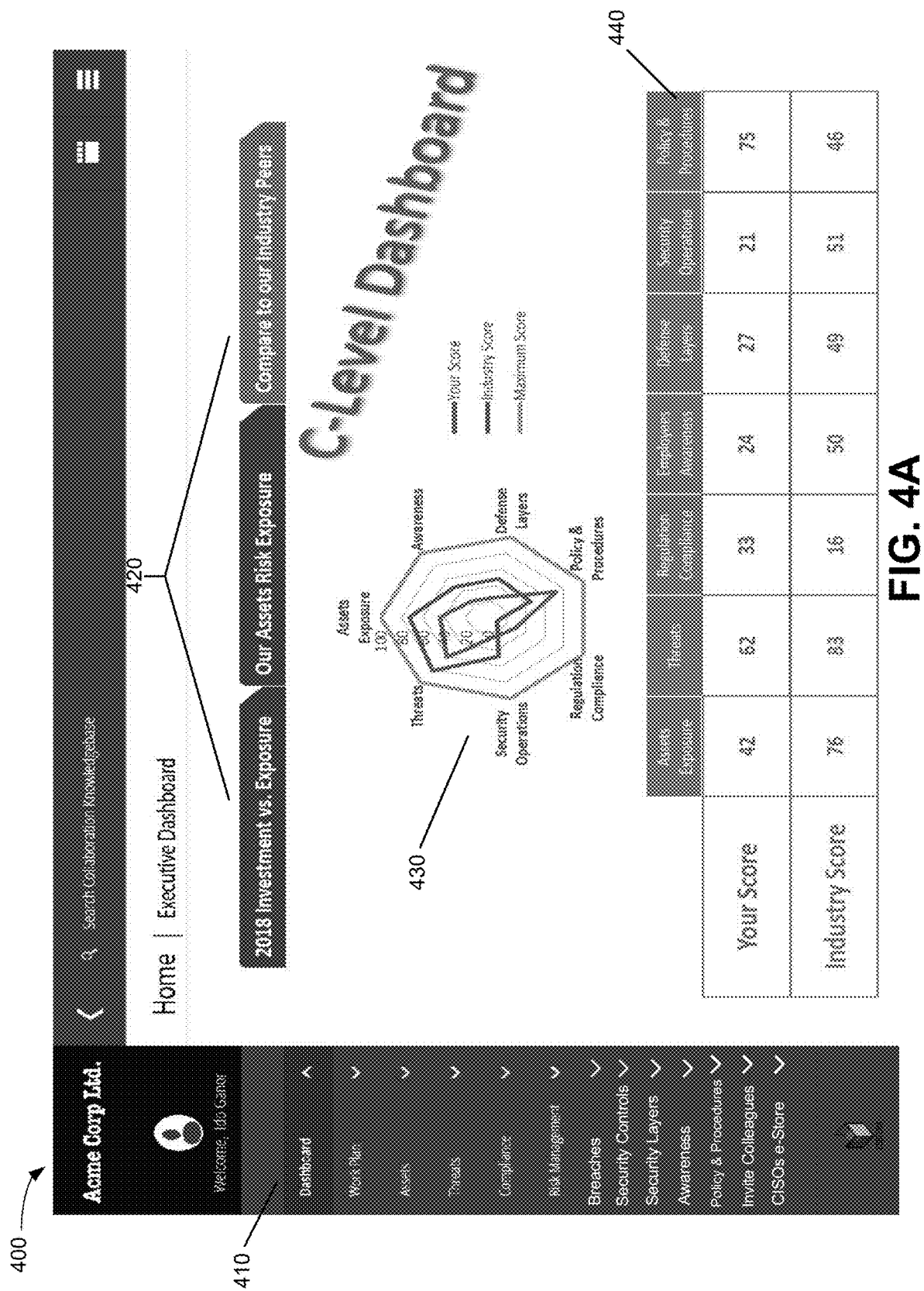
FIGS. 4A and 4B illustrate exemplary graphical user interfaces generated in accordance with exemplary implementations.

In one exemplary implementation, user interface/dashboard logic 310 may provide a graphical user interface (GUI) that allows a responsible party to view risk exposure information associated with an enterprise's assets. For example, FIG. 4A illustrates an exemplary GUI/dashboard 400 generated by user interface/dashboard logic 310. Referring to FIG. 4A, GUI 400 is an "executive dashboard" intended to be viewed by a high level executive of an enterprise (e.g., Acme Corp. Ltd in this example). GUI 400 includes a selection area 410 that allows the user to select a Dashboard view, a Work Plan view, Assets view, Threats view, Compliance view Risk Management view, Breaches view, Security Controls view, Security Layers view, Awareness view, Policy and Procedures view, Invite Colleagues view and CISOs e-Store view. In other GUIs provided by user interface logic 310, selection area 410 may include additional and/or different selections. In this example, the Dashboard view has been selected.

The dashboard view includes a tabs area 420 that allows the user to select an investment versus exposure view, an assets risk exposure view and a comparison to industry peers view. In GUI 400, a comparison to the industry peer view has been selected. Area 430 of GUI 400 includes a graphical representation of various risks, such as assets exposure, awareness, defense layers, policy and procedures, regulation and privacy compliance, security and operations and threats with respect to a maximum score and scores of industry peers. Area 440 includes similar information as area 430 in table form. The information displayed in areas 430 and 440 is generated by user interface/dashboard logic 310 in conjunction with operations performed by other logic illustrated in FIG. 3 and as described below.

Referring to FIG. 4A, the asset exposure score of Acme Corp. is 42 percent, as compared to an industry score of 76 percent. As described above, a score of zero percent may indicate no/little threat and a score of 100 percent may indicate a highest threat level. The threats, regulation and privacy compliance, employees' awareness, defense layers, security operations, policy and procedures scores are 62, 33, 24, 27, 21 and 75, respectively, are illustrated, with values (e.g., average values) of industry peers being 83, 16, 50, 49, 51 and 46, respectively. Providing both a graphical and table showing assets' exposure versus industry peers/averages allows security personnel to quickly determine where the enterprise may be deficient with respect to various areas, such as asset exposure. For example, in FIG. 4A, the enterprise's score for policy and procedures is 75, which is considerably higher than the industry score of 46. This may mean that the enterprise needs to take actions to reduce its threat level for that category.

ECRP system 130 may obtain asset exposure information for peers in the same/similar type of business from multiple sources using, for example, profiling logic/mechanisms associated with identifying similar types of businesses. For example, ECRP system 130 may obtain information from peers via third parties that collect and compare information/data regarding security incidents, deployments, etc., by aggregating data from thousands of audits and penetration tests conducted by the particular enterprises/system owners. ECRP system 130 may also obtain peer information from each deployment of ECRP system 130 at an enterprise. In this case, enterprises using/deploying ECRP system 130 will be required to provide approval of sharing of aggregated and un-recognized/anonymized data with ECRP system 130 for the purposes of ECRP system 130 generating industry peer asset risk and threat information prior to any of the enterprise's data is used in this manner.

Figure 4B:
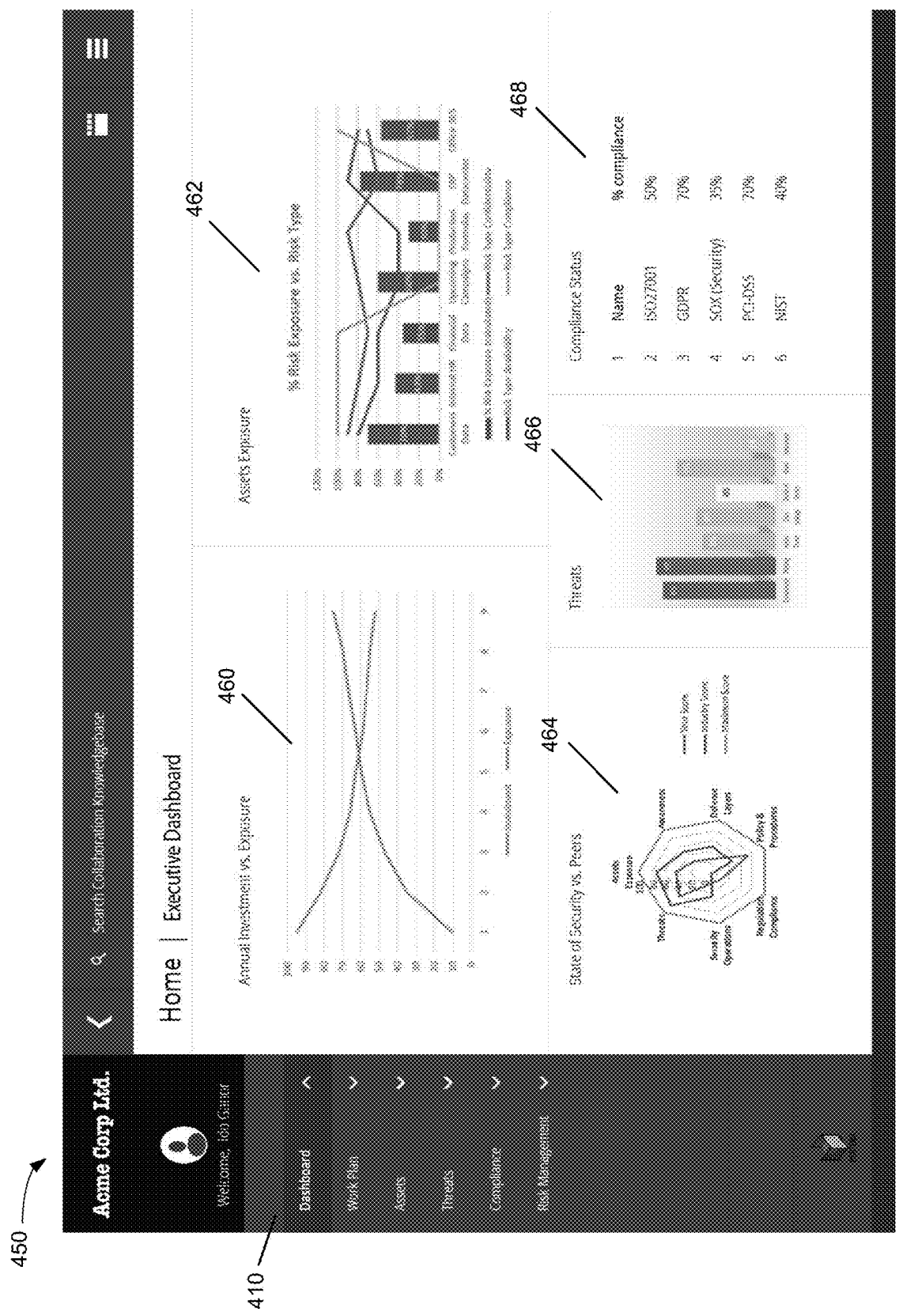

FIG. 4B illustrates another exemplary GUI generated by user interface/dashboard logic 310. Referring to FIG. 4B, GUI 450 includes an investments versus exposure area 460, an assets exposure area 462, a state of security versus peers area 464, a threats area 466 and a compliance status area 468. Annual investments versus exposure area 460 graphically illustrates how increasing expenditures can reduce exposure. Assets exposure area 462 provides a bar graph illustrating a percentage risk exposure for various asset types, such as customers' data, internal human resources (HR) data, financial data, upcoming campaigns, production formulas, enterprise resource planning (ERP) datacenter and Office 365. Area 464 provides a graphical representation of enterprise risk exposure and average industry risk exposure. Area 466 illustrates various types of threats, such as ransomware, phishing, insider threats, data leakage, denial of service, worms, and website defacement, and their probability to occur. Compliance area 468 illustrates percent compliance with various standards, such as ISO27001, GDPR, SOX (Security), PCI-DSS and NIST.

By viewing GUIs 400 and/or 450, responsible parties associated with an enterprise can quickly ascertain threat levels, exposure levels, etc., in an efficient manner without requiring access to multiple different systems and/or calling people responsible for particular aspects of enterprise security. In addition, the GUIs provided by system 130 also advantageously enable parties responsible with enterprise security to make any necessary changes to enterprise security without having to spend considerable time contacting different parties to obtain the needed information.

Security policy and procedures logic 320 may include logic associated with security operations/procedures for the enterprise. For example, cyber risk management and security policy and procedures logic 320 may store policy information, such as whether particular user devices 110 are permitted to access company private information/databases, access external networks, etc. Security policy and procedures logic 320 may also store policy information with respect to user behavior in an enterprise network, such as whether users are permitted to download and execute files attached to email, execute files downloaded from websites located externally from the enterprise, receive unsolicited correspondence from individuals outside the company, etc. Security policy and procedures logic 320 may also store information identifying particular industry security standards with which the enterprise complies. Security policy and procedures logic 320 may be used by other logic or modules illustrated in FIG. 3 to determine whether enterprise procedures for an enterprise/company are being complied with. For example, cyber risk management and strategic planning logic 330 and/or machine learning and profiling logic 380 may use information stored in security policy and procedures logic 320 to generate asset risk exposure and threat exposure measures that will be used by user interface logic/dashboard logic 310 to display information of interest (e.g., GUI 400, GUI 450, etc.).

Cyber risk management and strategic planning logic 330 (also referring to herein as cyber risk management logic 330 and/or strategic planning logic 330) may include logic to identify an enterprise's strategy with respect to calculating risks and managing security, including mitigating cyber attacks, following particular security standards, etc. Information stored in cyber risk management and strategic planning logic 330 may be used by a CISO or other executive management to determine whether an enterprise's strategic security plan is being complied with. For example, cyber risk management and strategic planning logic 330 and/or audit and security controls logic 340 may use information stored in cyber risk management and strategic planning logic 330 to determine whether the enterprise has installed the latest anti-virus software, has installed firewalls at the correct locations, etc. As another example, cyber risk management strategic planning logic 330 may identify whether upgrades to particular user devices 110 or overall network security has been performed on a regular basis in accordance with information stored in security policy and procedures logic 320.

In an exemplary implementation, cyber risk management and strategic planning logic 330 may interface with machine learning and profiling logic 380 to enable an enterprise to align its cyber work plans and security investments to the desired critical business assets' risk exposure, compare an enterprise's risk exposure to industry peers and competitors, evaluate threat levels across an enterprise, view ongoing, real-time cyber security risk status, recommend and prioritize courses of actions (e.g., work plans, mitigations, budgets), govern compliance activities and regulation controls, manage day-to-day CISO tasks and responsibilities, including incident follow-up, awareness programs, security controls, policies and procedures, etc.

Audit and security controls logic 340 may include logic to identify whether an enterprise's security policies are being properly enforced and verified, as well as manage security surveys, audits and penetration tests to detect vulnerabilities and assets' exposure. Such audits and surveys may be conducted by third parties which will be provided with access to ECRP system 130 for the purpose of reporting findings and recommendations. For example, audit and security controls logic 340 may determine whether an enterprise's response to a cyber attack was handled in accordance with the enterprise's strategic policies stored in cyber risk management and strategic planning logic 330. Audit and security controls logic 340 may also provide information indicating whether a particular security operations team has provided adequate security (e.g., firewalls, IDSs, etc.) in accordance with an enterprise policy and/or in accordance with a security standard (e.g., ISO27001, PCI, NIST, GDPR, etc.). Audit and security controls logic 340 may further determine whether software upgrade or patches have been installed on a periodic basis (e.g., every 30 days) in accordance with enterprise policies, whether employee security awareness programs have been administered in accordance with enterprise policies, etc.

Security operations logic 350 may store security operations information with respect to an enterprise and determine whether an enterprise's security operations personnel are complying with the enterprise's security operations policies. For example, security operations logic 350 may determine whether an appropriate security operations team/personnel are properly performing routine tasks, such as upgrades to various security devices, user devices 110, etc., to ensure that potentially malicious devices 160 and internal cyber threats (e.g., from user devices 110), are not able to obtain company confidential/private information. Security operations logic 350 may also log information to allow CISOs or other network security personnel to review each security team's operational compliance with enterprise security policies.

Enterprise governance, regulations, management and compliance (GRC), disaster recovery and business continuity planning (DR/BCP), and employee awareness logic 360 may include logic associated with identifying threats and exposure of enterprise assets, as well as allowing enterprise personnel to manage and mitigate risk from a single platform/system. For example, GRC logic 360 may include logic to determine whether an enterprise's risk compliance policies are being complied with. As an example, GRC logic 360 may determine whether software and/or hardware upgrades are being installed on various user devices 110 on a regular basis to mitigate newly identified malware. In addition, DR/BCP logic 360 may determine whether an enterprise's disaster recovery and business continuity planning policies are in place and being complied with, such as whether backup email servers are operational and being tested on a regular basis.

Knowledge base and report logic 370 may include logic that stores a company's professional knowledge with respect to managing enterprise security. Knowledge base logic 370 may interface with machine learning logic and profiling logic 380 to generate work plans and reports. For example, knowledge base and report logic 370 may include logic to generate and store various reports, including allowing a CISO or other personnel to generate customized reports. For example, report logic 370 may access information stored in security database(s) and automatically generate security reports on a periodic basis (e.g., daily, weekly, monthly, etc). Report logic 370 may also allow a user (e.g., CISO) to customize reports identifying particular security compliance issues with an enterprise.

Machine learning logic and profiling logic 380 may include machine learning algorithms, such as Bayesian statistics and/or models, to analyze inputs, rules (e.g., rules stored in security policy and procedures logic 320, cyber risk management and strategic planning logic 330 and knowledge base and report logic 370) and generate risk prediction information identifying, for example, asset risk exposure levels for an enterprise's assets and threat exposure levels for particular threats. Machine learning logic and profiling logic 380 may also generate a work plan associated with mitigating risk and asset exposure levels based on received inputs, such as inputs from other logic illustrated in FIG. 3, as well as input from human personnel entered via user interface/dashboard logic 310 to calculate or predict assets' risk exposure, threat exposures, regulation and privacy laws compliance and generate work plans to reduce cyber threats, as described in detail below. Machine learning and profiling logic 380 may also profile the enterprise with a cluster or group of profiles of enterprises with common attributes, such as industry, size, number of employees, security exposure, etc.

Communication logic 390 may include logic to transmit and receive information to/from other devices in environment 100. For example, communication logic 390 may collect data from multiple sources (e.g., security management teams/systems not shown in FIG. 3) and provide the information to logic elements 310-380 illustrated in FIG. 3 for processing and presenting the data in a manner that facilitates its use by the appropriate security personnel.

Communication logic 390 may also transmit and receive security alerts to/from enterprise personnel. For example, communication logic 390 may transmit a security alert to all user devices 110/enterprise personnel in response to a new cyber threat outbreak. Communication logic 390 may also transmit security alerts to enterprise managers in response to a particular threat level or asset exposure level.

Although FIG. 3 shows exemplary components of system 130, in other implementations, system 130 may include fewer components, different components, differently arranged components, or additional components than depicted in FIG. 3. In addition, functions described as being performed by one of the components in FIG. 3 may alternatively be performed by another one or more of the components of system 130.

Figure 5:
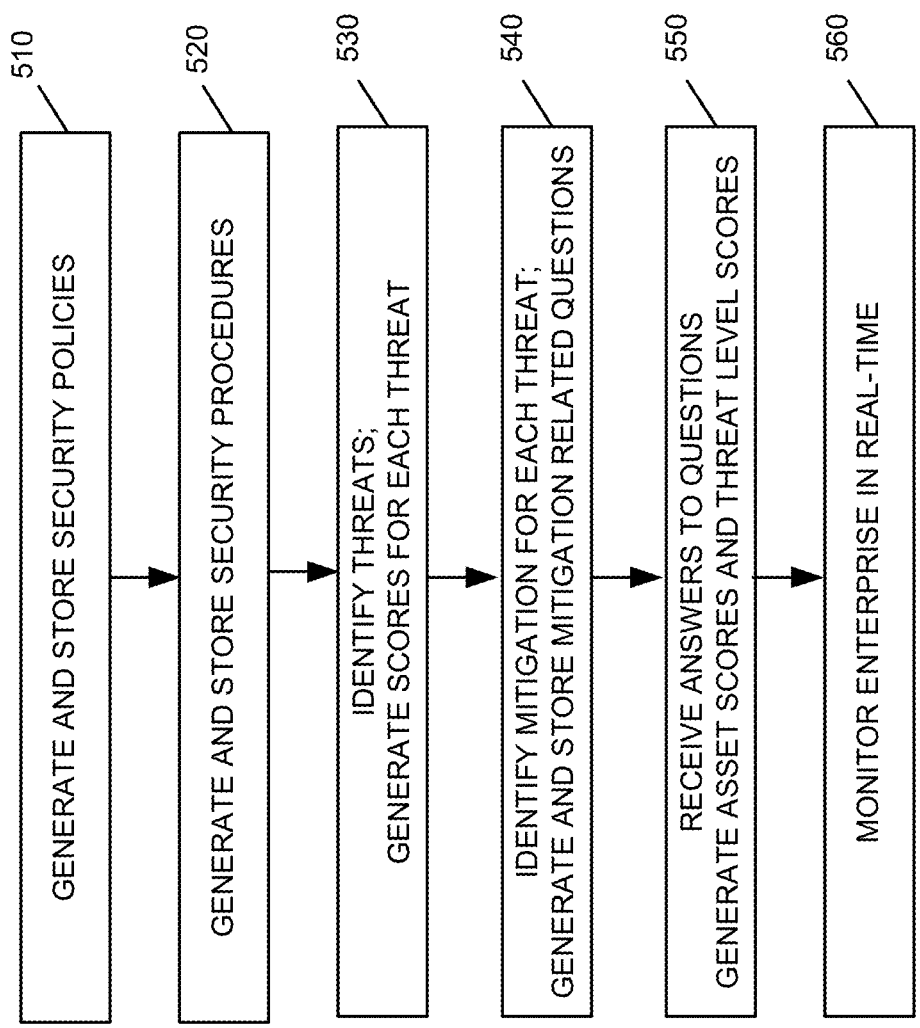
FIG. 5 is a flow diagram illustrating processing by various components illustrated in FIG. 3 in accordance with an exemplary implementation.

FIG. 5 is a flow diagram illustrating exemplary processing performed by system 130 in accordance with one implementation. Processing may begin with generating and storing one or more security policies (block 510). For example, security personnel may use security policy and procedures logic 320 to review security policies within an enterprise. Such security policies may provide templates that define types of communications, volume of data associated with communications, access level information, etc. A CISO or other responsible security personnel may use these templates to generate the particular security policies and procedures for the enterprise's assets and network. In other implementations, security policy and procedures logic 320 may obtain security policies and security controls, such as policies associated with particular security standards (e.g., ISO27001, PCI, NIST, GDPR), policies associated with various assets/systems used by enterprise security teams, etc., from other systems/devices (not shown in FIG. 3) and store the security policies.

Processing may continue with generating and storing security procedures (block 520). For example, security personnel can use cyber risk management and strategic planning logic 330 and/or cyber risk management and strategic planning logic 330 to store enterprise security procedures, ranging from how routine security audit operations should be performed to how responses to cyber threats are to be handled. In one implementation, policy and procedures logic 320 may automatically generate templates for security procedures based on information provided by a CISO or other security personnel via a GUI associated with establishing enterprise procedures. In other implementations, security policy and procedures logic 320 may obtain security procedures associated with an enterprise's security policies from other systems/devices (not shown in FIG. 3) and store the security procedures.

System 130 may identify various threats (block 530). For example, there may be hundreds of potential cyber threats facing an enterprise. In an exemplary implementation, personnel associated with the enterprise may identify a certain number of the most dangerous and/or likely threats. For example, security personnel may identify anywhere from 10 to 20 of the most dangerous and/or likely threats. Each threat scenario may then be measured on a scale of 0 to 100 (or 1 to 5) with respect to its "bad" impact on Confidentiality, Integrity and Availability of enterprise assets, with a score of 0 corresponding to no/very little impact and a score of 100 corresponding to the highest impact. As an example, a Ransomware attack may have a score of 0 with respect to Confidentiality, a score of 0 with respect to Integrity and a score of 100 with respect to Availability, since if successful, a Ransomware attack may block the enterprise's access to its own assets.

In addition, in order for a threat to occur, the threat typically occurs in a number of steps (e.g., $S_1$ through $S_n$, where n represents the number of steps). Typically, the threat's bad impact is built throughout its advancements until a certain point is reached, resulting in a full impact. Once the impact is full, system 130 determines the damage and identifies recovery measures. For example, in one implementation, for each step $S_1$ through $S_n$ of an attack, system 130 identifies certain prevention activities $P(S_1)_1 \ldots P(S_1)_x$, $P(S_2)_1 \ldots P(S_2)_y$, $\ldots$, $P(S_n)_1 \ldots P(S_n)_z$, where x, y and z represent the number of prevention activities for each respective step, and x, y and z can be the same number or different numbers, depending on the particular prevention step. Each prevention activity may influence and/or prevent the corresponding step of the attack from occurring. In such case, the prevention activities lower the Confidentiality, Integrity and/or Availability scores.

In addition, for each prevention activity from $P(S_1)_1$ through $P(S_1)_n$, system 130 may store a list of questions or checks/controls $Q(C_1) \ldots Q(C_n)$, that provides responses to the questions or measurements associated with the controls that will be used to determine their value/impact of the prevention activity.

In an exemplary implementation, system 130 defines each asset as one of the following types: Data, Infrastructure or Application. System 130 may also assign each asset a level of "criticality" in terms of Confidentiality, Integrity and Availability. For example, system 130 may assign human resources (HR) data a high level of criticality for Confidentiality (e.g., five on a scale of 1 to 5), a non-critical level in terms of Availability (e.g., one on a scale of 1-5), and a highly important level of criticality in terms of Integrity (e.g., four on a scale of 1-5).

Cyber risk management and strategic planning logic 330 may process each of the selected threats (e.g., 10-20 identified threats) in this manner and generate a score for each threat (block 530). Cyber risk management and strategic planning logic 330 may also reduce the scores for Confidentiality, Integrity and Availability based on the prevention activities implemented by the enterprise. For example, an initial threat score for an email attack may be given a score of 95 (indicating that such a threat is very likely to occur). If the enterprise employs strict email policies prohibiting the downloading and executing of files received via email, cyber risk management and strategic planning logic 330 may reduce the score to, for example, 35.

Figure 6A:
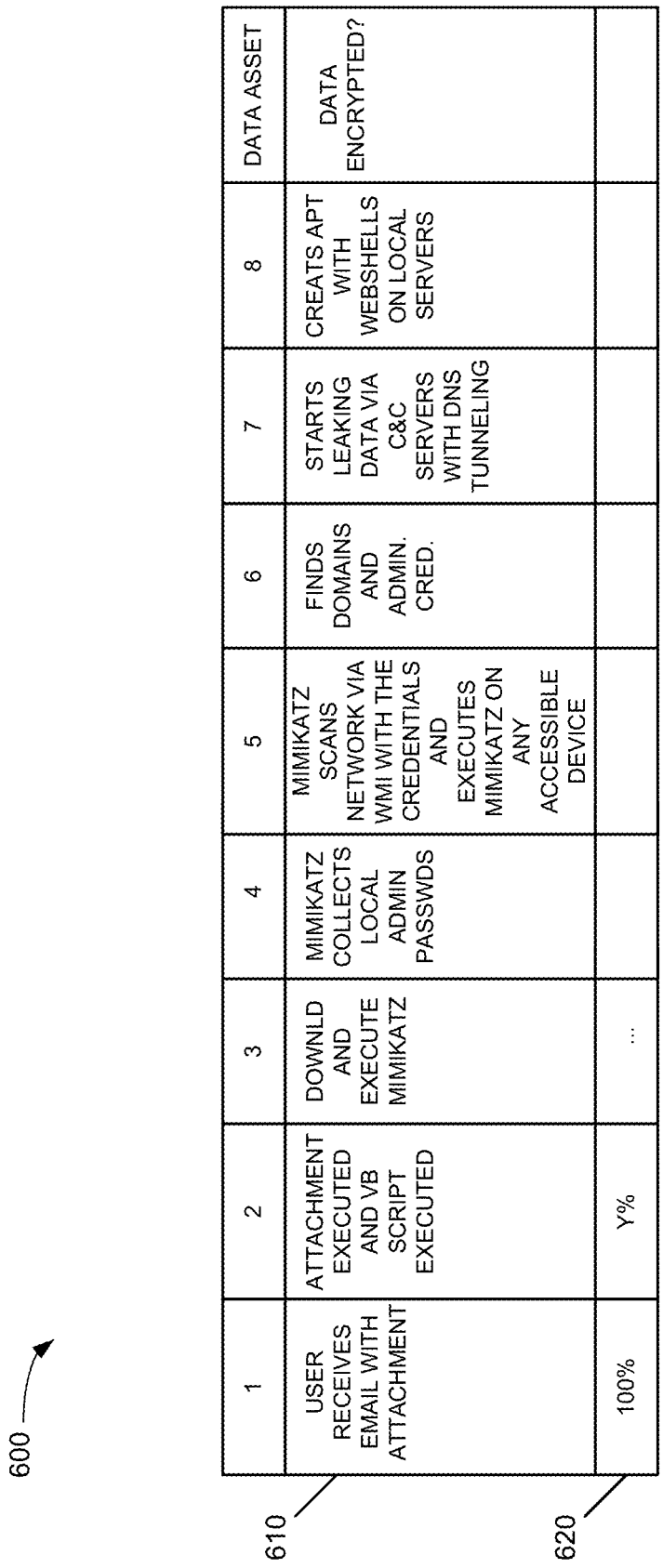

As an example, one threat or attack scenario may be an email attack in which the malicious party attempts to obtain company private information. In this example, cyber risk management and strategic planning logic 330 may identify steps associated with the email attack, as illustrated in FIG. 6A. Referring to FIG. 6A, eight steps are identified in table 600, row 610. It should be understood that cyber risk management and strategic planning logic 330 may identify more or fewer steps, including sub-steps in various implementations. Step 1 ($S_1$) may include one of user devices 110 receiving an email with an attachment and step 2 may include user device 110 executing a visual basic (VB) script. Step 3 may include user device 110 downloading and executing a malicious program, such as Mimikatz. Step 4 involves the malicious program (e.g., Mimikatz in this example) collecting local admin passwords. Step 5 includes Mimikatz scanning the enterprise's network with Windows Management Infrastructure (WMI) with the local admin passwords and executing Mimikatz on an accessible device (e.g., one of user devise 110). Step 6 involves Mimikatz obtaining Domain Admin credentials and Step 7 includes the leaking of data via command and control (C&C) servers via domain name server (DNS) tunneling. Step 8 includes creating advanced persistent threat (APT) webshells on local servers. Referring to FIG. 6A, each of the steps may include a corresponding exposure level, illustrated in row 620. System 130 may generate the exposure level based on the likelihood of each step occurring. For example, the enterprise may interface with outside entities/clients, so the likelihood of step 1 may be 100%, as illustrated in FIG. 6A. Therefore, the likelihood of each step in the email attack scenario is based on the particular enterprise. Cyber risk management and strategic planning logic 330 may also identify mitigation-related issues associated with an email attack, as illustrated in FIG. 6B (block 540). Referring to FIG. 6B, cyber risk management and strategic planning logic 330 may store the mitigation-related issues in table 640, row 642. For example, with respect to Step 1, row 642 indicates security awareness. Security awareness may refer to whether the enterprise regularly discusses and/or promotes security awareness behavior or measures. With respect to $S_2$, row 642 indicates a web strict email policy to block executable/macro files. With respect to $S_3$, row 642 indicates a web policy to block the downloading of executable files. With respect to $S_4$, row 642 indicates a strict endpoint hardening to deny the execution of Powershell. With respect to $S_5$, row 642 indicates having an internal firewall (FW) and/or host intrusion prevention system (HIPS) configured to block lateral movement. With respect to $S_6$, row 642 indicates allowing usage of Domain Admin credentials only on strict secured jump servers. With respect to $S_7$, row 642 indicates having the boundary FW check DNS traffic at application level and allow only real DNS traffic. With respect to $S_8$, row 642 indicates implementing file integrity monitoring on servers with Internet access. These mitigation-related actions may be considered and/or performed by the enterprise to reduce the threat exposure level for an email attack. For example, implementing an email policy to block executable/macro files may reduce the threat level of an email attack by a considerable amount (e.g., from 95 percent down to 10 percent).

Figure 6C:
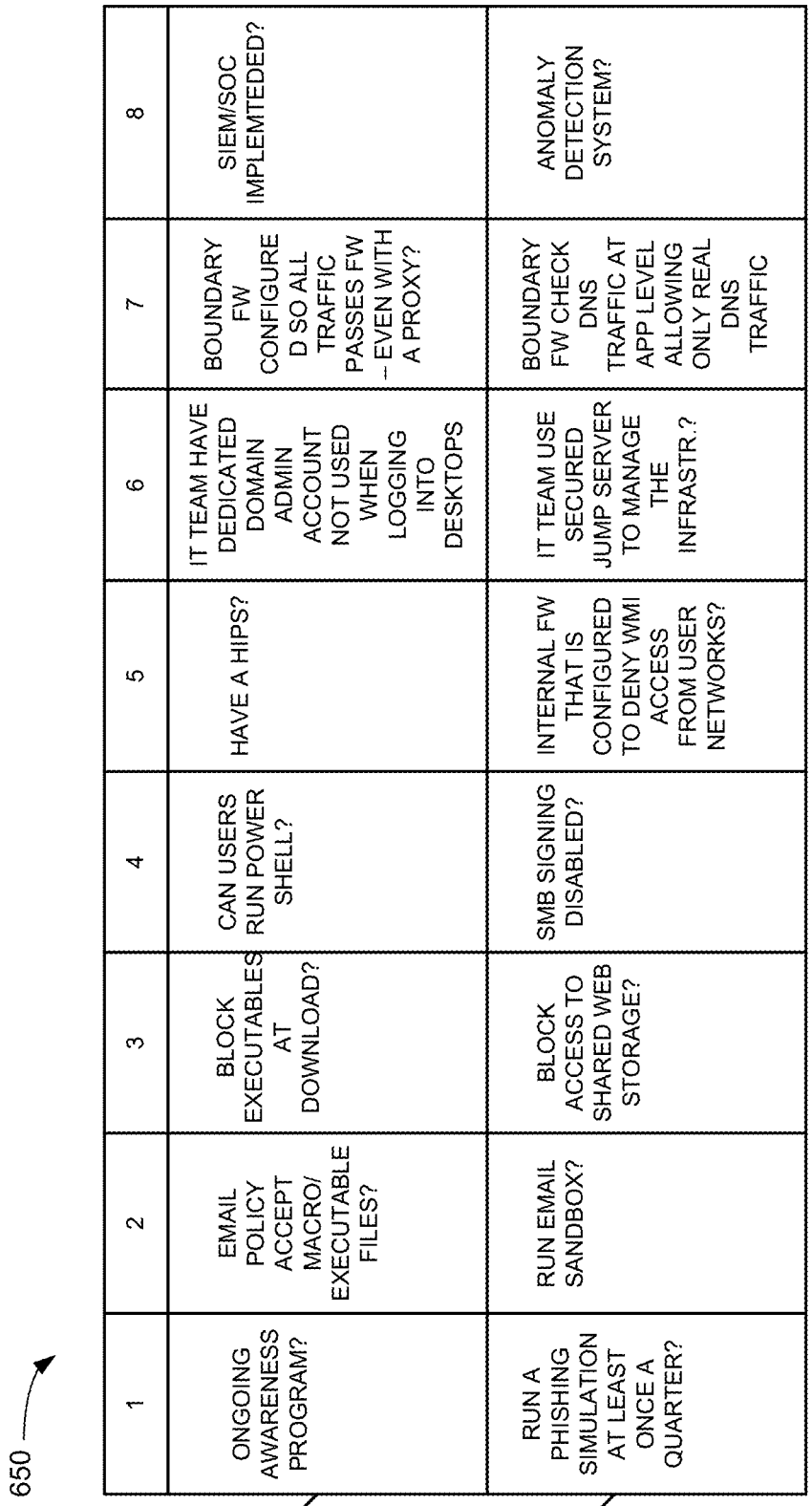

Cyber risk management and strategic planning logic 330 may also store questions associated with the attack that will determine the level of mitigation for each threat (block 540). For example, referring to FIG. 6C, cyber risk management and strategic planning logic 330 may store table 650 including rows 652 and 654. Referring to FIG. 6C, row 652 may store questions inquiring whether the enterprise has an ongoing awareness program, whether the enterprise has an email policy to accept Macro/executable files and whether the enterprise blocks all executable downloads. Row 652 may also store questions whether the users can run Powershell, whether the enterprise has a HIPS, whether the IT team has a dedicated Domain admin account which is not used when users log into their desktop computers/workstations, whether the boundary FW is configured to allow all traffic to pass, even if there is a proxy, and whether a secure information and event management/secure operations center (SIEM/SOC) is implemented.

Row 654 may store additional questions, such as whether the enterprise runs a Phishing simulation periodically (e.g., once a quarter), does the enterprise have an email sandbox solution, does the enterprise block access to shared web storage, is server message block (SMB) signing disabled, and does the enterprise have an internal FW that is configured to deny WMI access from users. Row 654 may further include questions, such as does the IT team use a secured jump server to manage the infrastructure, is the boundary FW configured to check DNS traffic at the application level and does the enterprise have an anomaly detection system.

Figure 6D:
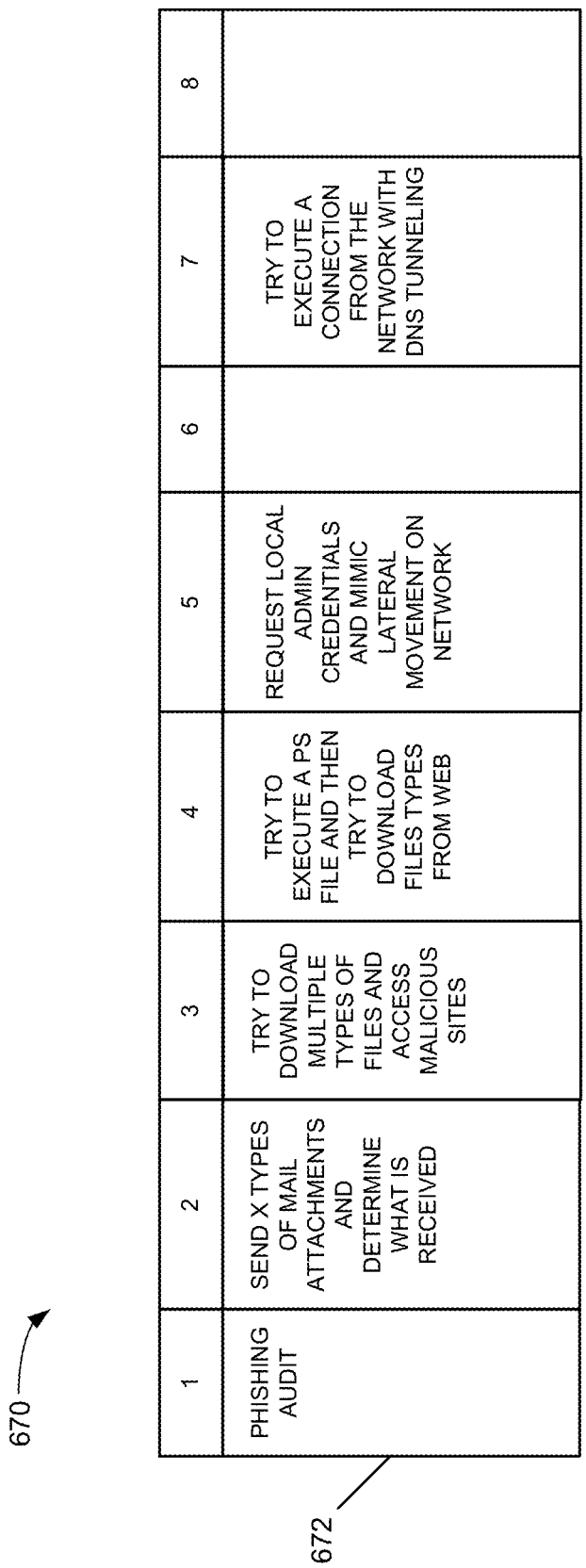

Cyber risk management and strategic planning logic 330 may generate technical assessments, security audits, penetration tests and other similar procedures, based on answers to the questions and steps of the email attack. Alternatively, cyber risk management and strategic planning logic 330 may generate technical assessments not related to particular answers to questions, but based on the need to detect the level of mitigation referred to in FIG. 6B, row 642. Referring to FIG. 6D, cyber risk management and strategic planning logic 330 may store table 670 that includes row 672 storing information associated with steps of the email attack. For step 1 ($S_1$), a Phishing audit may be needed, for $S_2$, the platform may need to send a number of different types of emails with attachments and determine what is received. For $S_3$, the platform may need to try to download multiple types of files/access malicious sites. For $S_4$, the platform may need to try to execute a Powershell file and then try to download files types from the web. For $S_5$, the platform may need to request local Admin credentials and then mimic lateral movement on the network. For $S_7$, the platform may need to try to execute a connection from the network with DNS tunneling. In this example, steps 6 and 8 may not include particular technical assessment information. In this manner, system 130 may generate technical assessments associated with various steps of the attack as possible actions/responses to determine how the enterprise actually handles such an attack.

System 130 may provide the questions illustrated in table 650 (FIG. 6C) to personnel associated with the enterprise, such as a security officer, manager, etc., and input the answers to system 130 via, for example, user interface/dashboard logic 310 (block 550). Cyber risk management and strategic planning logic 330 may then generate an asset risk exposure score for each of the assets, such as HR assets, intellectual property assets, proprietary information, organizational information, contract information, financial data, customer data, etc. (block 550). Cyber risk management and strategic planning logic 330 may also generate a threat exposure score for each of the identified threats based on enterprise activity and the answers associated with mitigation-related activities (block 550). For example, as described above, if cyber risk management and strategic planning logic 330 determines that the answer to questions stored in table 650 indicate that the enterprise enforces an email policy to block executable files, cyber risk management and strategic planning logic 330 may significantly reduce the threat score for an email attack. Cyber risk management and strategic planning logic 330 and/or machine learning and profiling logic 380 may perform similar calculations for each of the identified threats to generate the final threat score for each threat.

System 130 may also automatically monitor the enterprise for security compliance in accordance with the stored security policies and procedures (block 560). For example, audit and security controls logic 340 and security operations logic 350 may monitor the enterprise's security in real-time based on the stored security policies/procedures to determine whether the appropriate security teams are performing their tasks in accordance with enterprise policies and procedures. As an example, an enterprise policy may indicate that an outside company is to perform a security survey every six months to identify potential gaps in security for the enterprise. In this case, the appropriate security team is to review the issues identified by the outside company and prioritize the issues according to severity and provide recommendations to fix the identified issues. The CISO or other security manager may then assign tasks to the appropriate security operations team to fix and/or mitigate the security issues/gaps. Audit and security controls logic 340 may determine whether the outside company has performed a security assessment survey within the appropriate periodic basis (e.g., every six months), whether the mitigation tasks assigned to the security operations team have been performed, and/or whether the tasks have been performed on time and within the budget provided. In situations in which a particular operation/procedure has not been performed in accordance with enterprise policies/procedures, user interface/dashboard logic 310 may provide the appropriate alert, such as signal the CISO via email, text alerts, via screen pops, etc.

As another example, an enterprise policy may indicate that no users (e.g., user devices 110) can connect to network 140 remotely (e.g., over an unsecured network). In this case, the appropriate security team should configure a firewall so that no users can install software to allow remote access. Audit and security controls logic 340 may verify that the appropriate security team has complied with the policy specifying no remote access and has properly documented that all devices for the enterprise have been checked to ensure compliance.

Figure 7:
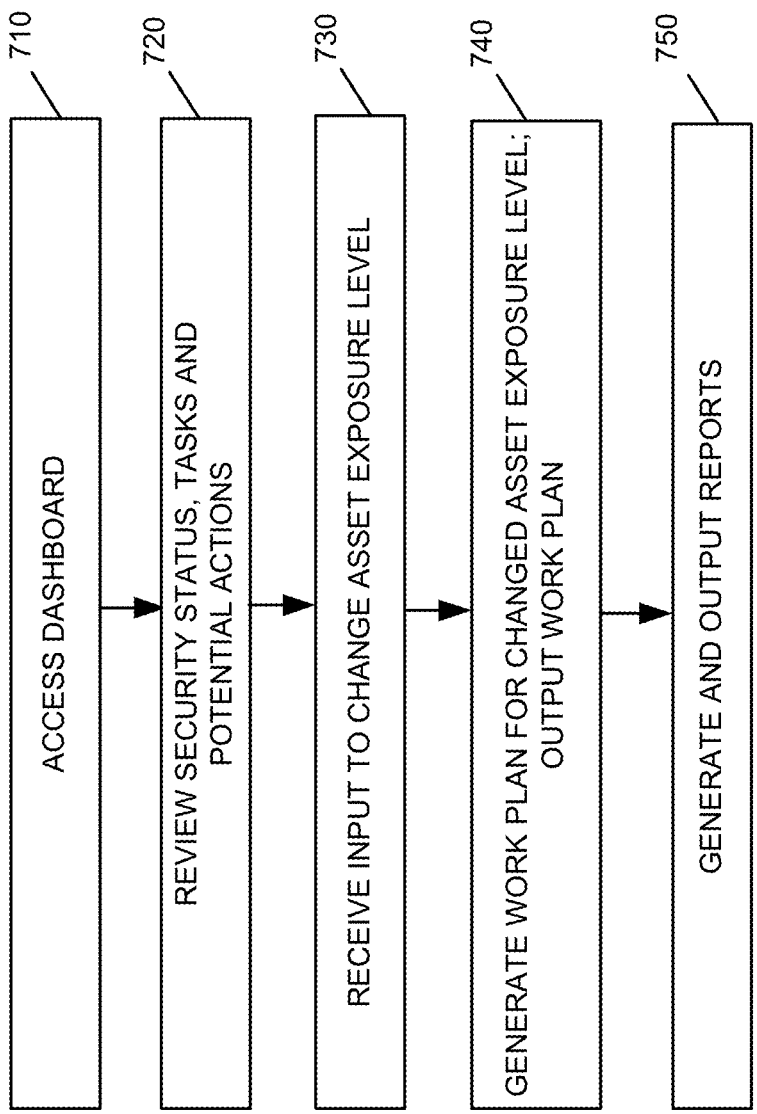
FIG. 7 is a flow diagram illustrating exemplary processing associated with viewing security status information.

System 130 may also allow security personnel to view network security compliance and manage overall enterprise security from a single location or multiple locations and/or identify problems. FIG. 7 is a flow diagram illustrating exemplary processing performed by system 130 in accordance with one implementation. Assume that a CISO is interfacing with system 130 and wishes to determine whether risk in the enterprise is being managed in accordance with enterprise policies, such as view overall risk for the enterprise, determine whether audits have occurred on a periodic basis, whether adequate security devices have been deployed in network 140, whether employee security awareness programs have been administered, etc. In this case, the CISO may access user interface/dashboard logic 310 and view a dashboard or interface screen associated with enterprise security (block 710).

Figure 8:
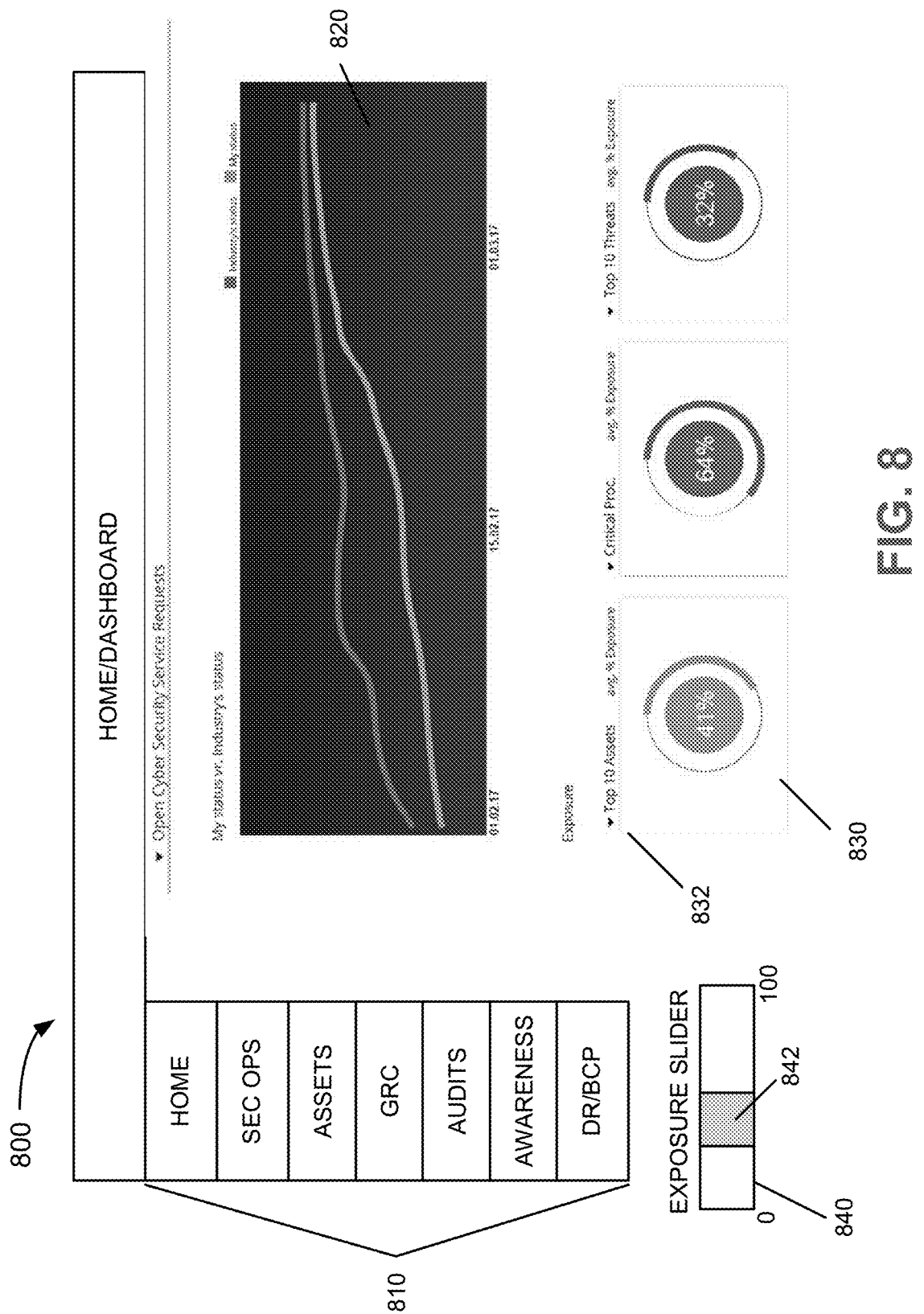
FIG. 8 illustrate an exemplary graphical user interface in accordance with an exemplary implementation.

FIG. 8 illustrates an exemplary GUI/dashboard 800 output by user interface/dashboard logic 310. Referring to FIG. 8, GUI 800 includes a number of selectable icons/interface elements at area 810, include a home icon/element, a security operations icon/element, an assets icon/element, a GRC icon/element, an audits icon/element, an awareness icon/element and a DR/BCP icon/element. The CISO may select any of these icons/elements at area 810 to obtain additional information regarding the particular item. For example, GUI 800 includes a graph at area 820 associated with selection of GRC element. In this case, graph 820 provides a comparison of the enterprise threat status over a period of time (i.e., one month in this example) as compared to the general industry threat status. In this manner, a CISO, business owner or C-level executive may be able to obtain a quick overview of threat status in an enterprise as compared to a benchmark/general industry threat level.

GUI 800 may further include an area 830 illustrating particular types of exposures, such as exposure of the company's top assets, exposure of critical processes, and top threats. In an exemplary implementation, the exposures may be generated by GRC logic 360 as percentages, with 100% being full exposure (e.g., no protection) and 0% being no exposure. For example, area 830 indicates top assets have an exposure of 41%, critical processes have an exposure of 61% and top threats have an exposure of 32%. The CISO may click on a drop-down menu in area 832 to obtain additional information regarding top assets exposure.

GUI 800 may also include an exposure slider at area 840 that allows a party to determine the impact of changing the exposure of particular assets via moving/dragging slider 842, as described in more detail below.

Assume that the user provides a selection at area 832 to obtain additional information. In this case, user interface/dashboard logic 310 provides the additional information. For example, FIG. 9 illustrates a GUI 900 illustrating the exposure for the top assets, such as human resource assets at 50%, intellectual property (IP) at 70%, contracts at 35%, finance data at 20% and customers' databases at 30%. In some implementations, the CISO may select any of the particular assets illustrated in GUI 800 to obtain further information regarding the particular asset/asset class and corresponding exposure.

Returning to FIG. 7, processing may continue with the CISO reviewing security status, tasks and potential actions (block 720). For example, security operations logic 350 may determine that proper network segmentation with respect to a particular enterprise asset (e.g., a database storing company private information, such as employee personal information including salary information) has not been performed in accordance with enterprise policies. In this case, the CISO may be able to quickly view enterprise security issues that need remediation and/or require additional attention.

Assume that the CISO wishes to simulate a change in exposure for the top 10 assets (block 730). In this case, the CISO may select slider 842 and move the slider toward the left to simulate a reduction in the exposure level or toward the right to simulate an increase in the exposure level. In this example, assume that the CISO wishes to simulate a reduction in the top 10 assets' exposure level from 41% to 15%. Cyber risk management and strategic planning logic 330 receives the input and may interface with machine learning and profiling logic 380 to generate a work plan that indicates what steps are involved to reduce the exposure level to the 15% level (block 740). The work plan may indicate that new equipment must be deployed (e.g., firewalls, intrusion detection systems, etc.), as well as the resources in time and cost to implement the plan. User interface logic 310 may then output the work plan via another GUI (block 740). In this manner, the CISO may be able to ascertain whether changes to the threat exposure level are feasible, without having to expend significant resources to generate the work plan.

ECRP system 130 may also automatically generate and output reports for viewing via ECRP system 130 or other devices (block 750). For example, knowledge base and report logic 370 may generate reports on a periodic basis for output via user interface/dashboard logic 310. Report logic 370 may also transmit the reports via communication logic 390 to the appropriate parties. The CISO may view the reports via dashboard 800, and also have options to create customized reports. In addition, ECRP system 130 may be configured to automatically (e.g., without human intervention) perform various security management and/or audit related functions allow the CISO to get a partial or comprehensive end-to-end view of enterprise security, thereby providing 24 hour per day monitoring of enterprise security compliance and issues that need remediation. In this manner, the CISO may be able to review statuses of particular enterprise security issues via dashboard 800. That is, the CISO may view the information of interest from a single platform (e.g., system 130). Advantageously, this provides the CISO with a single platform or system of records associated with managing enterprise security.

In some implementations, user interface logic 310 may allow the user to identify particular activities that may be performed, such as changing a policy, adding a firewall, etc. Cyber risk management and strategic planning logic 330 may then calculate a predicted change in assets' exposure based on the activity being performed. In this manner, a CISO may identify particular activities that may be contemplated within the enterprise and determine an asset risk level reduction if the activity is actually performed.

In addition, a CISO may be able to identify particular areas or departments within the enterprise that are not complying with security policies and procedure. In some implementations, system 130 may automatically generate and transmit a communication to the appropriate personnel when such a condition is detected.

Still further, in some implementations, user interface logic 310 may allow personnel to customize the interface/GUI to be displayed to the particular user. For example, a party associated with HR data may be able to customize the GUI associated with HR asset exposure to display an asset exposure percentage for HR data, an industry average exposure percentage, and a work plan associated with reducing the exposure percentage. In this manner, user interface logic 310 allows the user to select (e.g., via drop down menus) what data is to be displayed for that particular user.

As described above, ECRP system 130 may allow personnel associated with an enterprise access ECRP system 130 via ECRP system agent 132 via network 130. In other implementations, ECRP system 130 may be installed locally at the enterprise, in which case, enterprise personnel may access ECRP system 130 locally.

Figure 10:
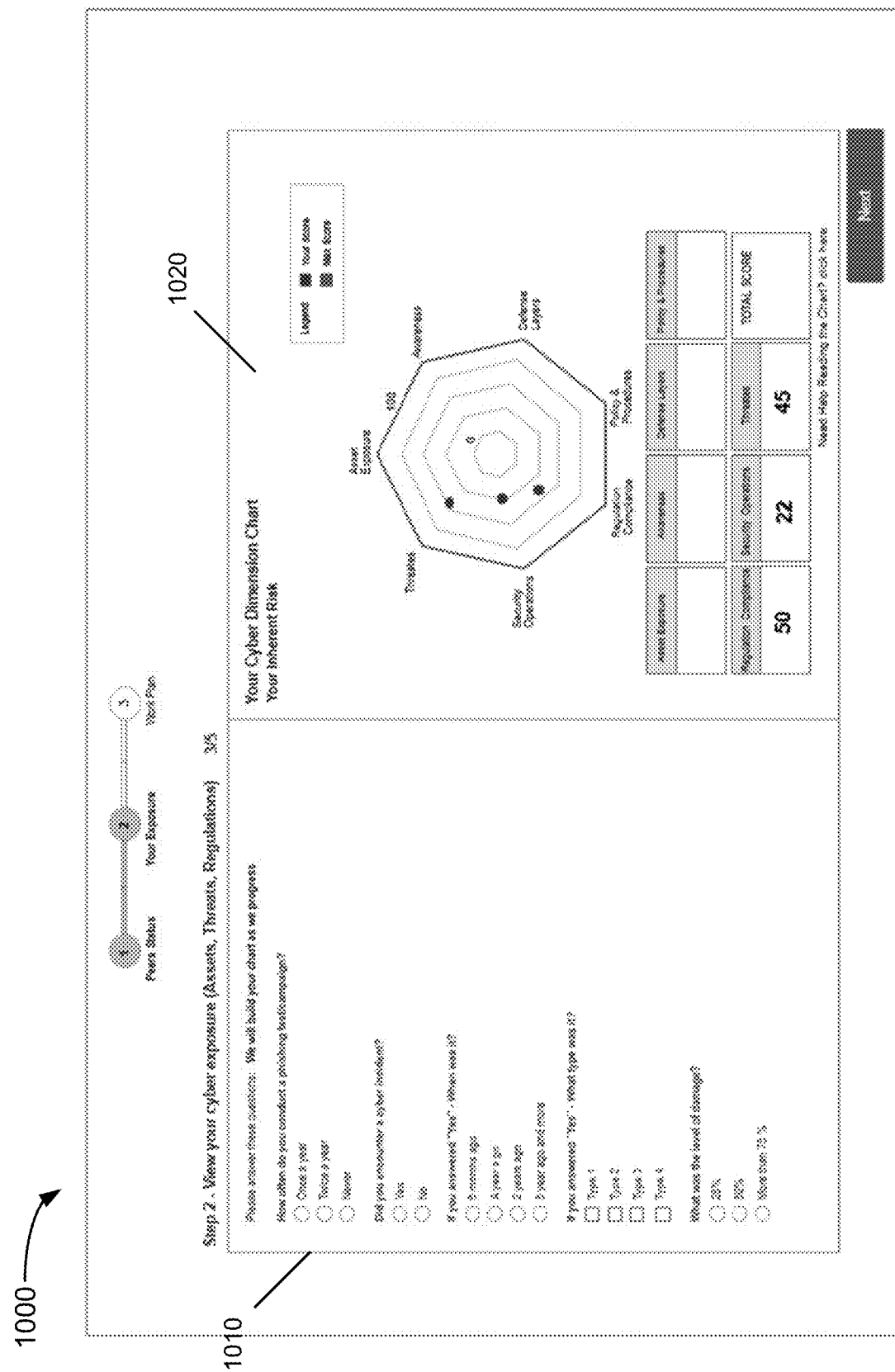
FIGS. 10-12 illustrate exemplary user interfaces associated with generating and displaying cyber security information in accordance with an exemplary implementation.
Figure 11:
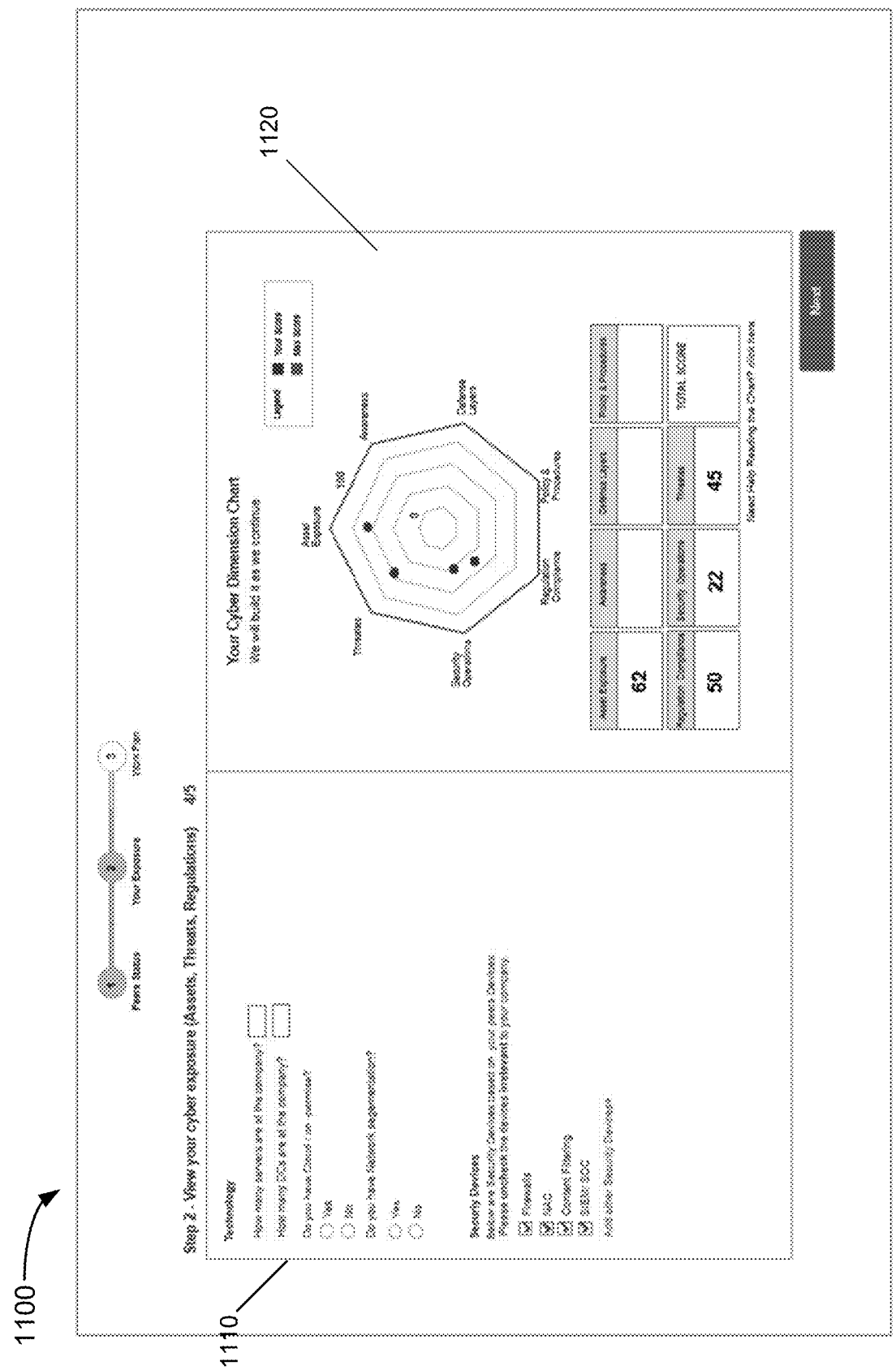
Figure 12:
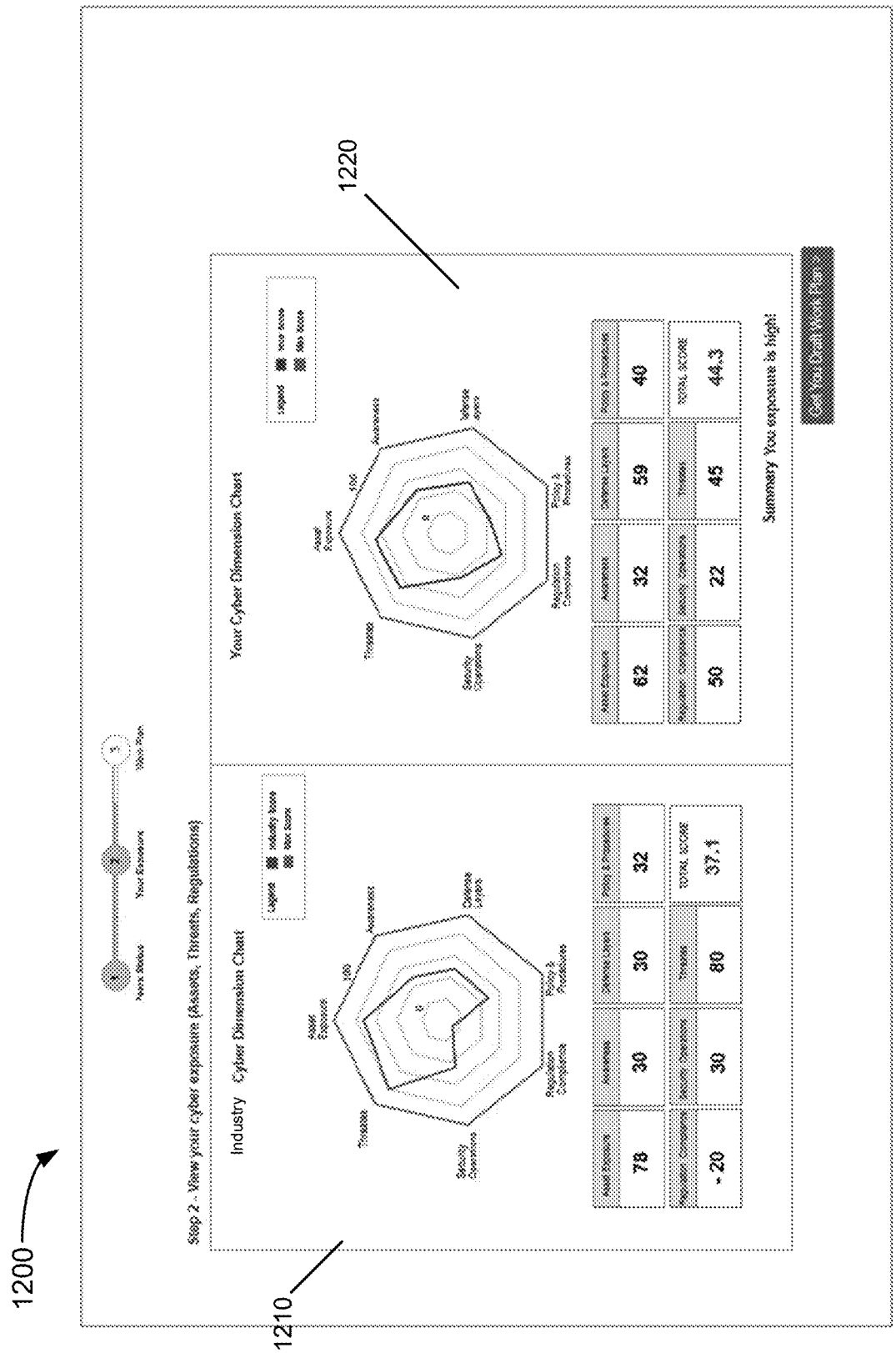

As also described above, ECRP system 130 may include a number of GUIs to allow enterprise personnel to obtain asset exposure and risk information. FIG. 10-12 illustrates an exemplary GUIs that may be provided via user interface/dashboard logic 310 to aid in generating and/or displaying exposure and threat level information. Referring to FIG. 10, GUI 1000 includes a questions area 1010, and a cyber exposure area 1020. Questions area 1010 includes a number of questions provided to enterprise personnel, such as "How often do you conduct a phishing test/campaign?"; "Did you encounter a cyber incident?"; etc. Cyber exposure area 1020 includes a graphical representation of asset exposure, awareness, defense layers, policy and procedures, regulation compliance, security compliance and threats. Cyber exposure area 1020 also includes the information in table form. In this example, a mitigation compliance score, security operations score and threats score of 50, 22 and 45, respectively, generated by ECRP system 130 are displayed.

FIG. 11 illustrates another GUI provided by user interface/dashboard logic 310, for example, in response to a user selecting the "next" button in GUI 1000. Referring to FIG. 11, GUI 1100 may include questions area 1110 and cyber exposure area 1120. Questions area 1110 includes additional questions, such as "How many servers are at the company?"; "Do you have network segmentation?"; etc. Questions area 1110 also includes questions regarding types of security devices installed by the enterprise, such as firewalls, NACs, content filtering, SIEM/SOC. Cyber exposure area 1120 includes the graphical representation and table form similar to items displayed in area 1020 of GUI 1000. In this example, an assets exposure score of 62 generated by system 130 is displayed.

FIG. 12 illustrates another GUI provided by user interface/dashboard logic 310, for example, in response to the user selecting the "next" button on GUI 1100. Referring to FIG. 12, GUI 1200 include an industry exposure area 1210 and an enterprise exposure area 1220. Industry exposure area 1210 displays industry/peer company averages and enterprise cyber exposure area 1220 displays the enterprise's exposure and risk scores for assets, awareness, defense layers, policy and procedures, regulation compliance, security operations and threats, along with an overall total score. In this manner, responsible security personnel may view GUI 1200 and quickly identify areas that may need immediate attention based on, for example, the individual score and/or the comparison to peer scores. In addition, by comparing industry exposure area 1210 to enterprise exposure area 1220, enterprise personnel (e.g., C-level executive) may be able to measure the performance and/or effectiveness of the enterprise personnel. For example, if the industry/peer scores in area 1210 are superior to the enterprise's scores in area 1220, this may indicate that the enterprise personnel are not performing adequately.

Figure 13:
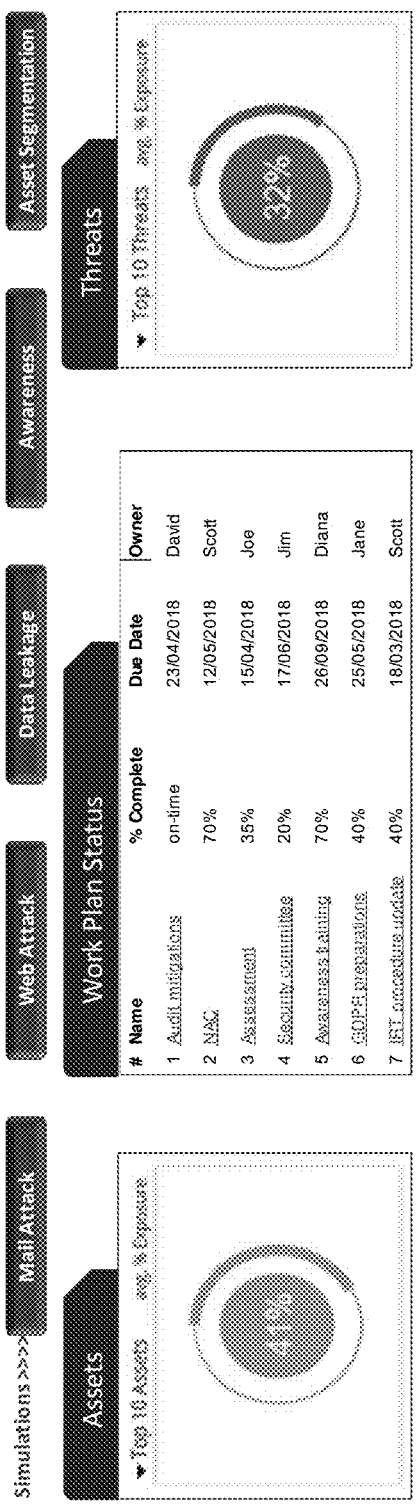
FIG. 13 illustrates an exemplary user interface associated with running simulations in accordance with an exemplary implementation.
Figure 13:
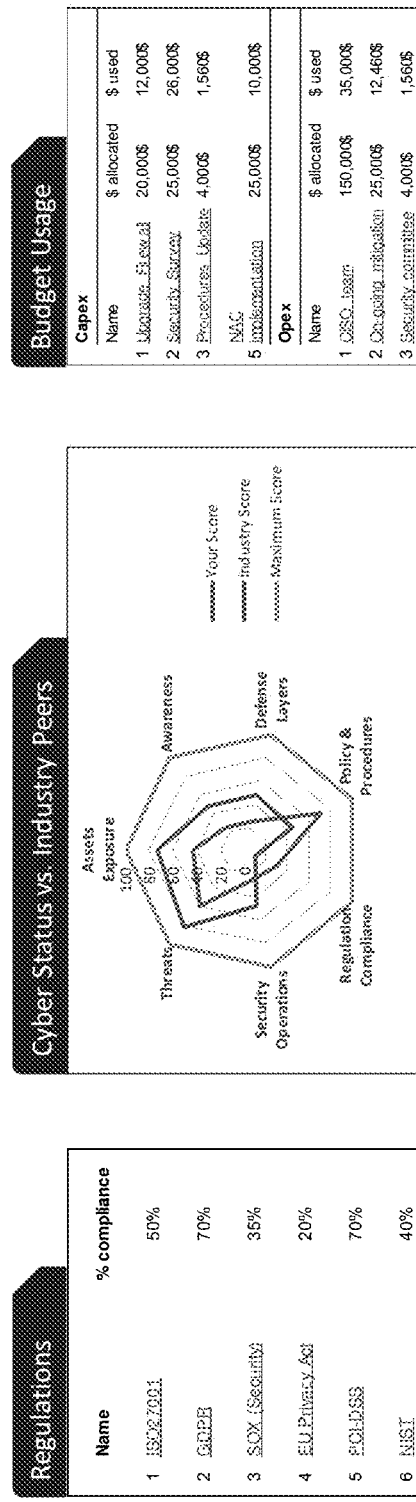

As also described above, ECRP system 130 may run various simulations. FIG. 13 illustrates an exemplary GUI provided by user interface/dashboard logic 310. Referring to FIG. 13, GUI 1300 includes a simulations area 1310 and cyber exposure area 1320. Simulation area 1310 includes selection inputs for an e-mail attack, web attack, data leakage, awareness and asset segmentation. By selecting any of these inputs, enterprise personnel may run the corresponding simulation. In response, ECRP system 130 runs the simulation and displays the results via another GUI. Cyber exposure area 1320 includes exposure for the top 10 assets, work plan status, threats, regulations, enterprise versus peer status and budget usage.

As described above, in some implementations, ECRP system 130 may automatically initiate measures to mitigate threats, such as deploy new security equipment (e.g., firewalls, IDSs, IPSs, etc.), re-deploy network security equipment, etc., automatically initiate new procedures and/or policies, etc. In addition, in some implementations, ECRP system 130 may automatically initiate measure when asset exposure information identifies a potential problem. For example, in response to identifying an exposure level of a particular asset above a threshold level, ECRP system 130 may also automatically deploy new security equipment (e.g., a firewall, IDSs, IPSs,), send alerts/communications to the appropriate personnel, quarantine or block access to the particular enterprise asset in which the exposure is above a threshold level, etc., to mitigate the asset exposure. In this manner, ECRP system 130 may automatically take measures until the enterprise is able to potentially identify a particular problem.

In addition, implementations described herein refer to receiving input from an enterprise that may include small companies to large corporations. In addition, in some implementations, ECRP system 130 includes a profiling mechanism/logic for each enterprise using machine learning and profiling logic 380. ECRP system 130 profiles enterprises into clusters with common criteria/characteristics and similar cyber risk exposure. For example, as part of the "onboarding" process associated with a new enterprise accessing ECRP system 130, ECRP system 130 provides a number of questions to the enterprise and creates a profile for the enterprise based on, for example, the industry/line of business, size, geographic location, number of offices, number of IT personnel, security budget, competitors, etc. In this manner, ECRP 130 uses the profile to identify the enterprise's peers.

CONCLUSION

Implementations described herein include a system of records (SOR) that provide an enterprise cyber security risk management and security operations management for managing enterprise assets, compliance, budgets, professional knowledge, etc., and quantifying risk exposure for enterprise assets and risk exposure for particular cyber threats. In this manner, security personnel, business owners, CISOs, C-level executives, etc., are provided with a comprehensive, flexible, data driven platform that enables smart cyber decisions, real-time monitoring and analysis of enterprise security and, more particularly, to managing an enterprise's compliance with the enterprise's regulations, privacy laws, policies, procedures and risk management goals. This technology-implemented solution may allow enterprises to integrate security management under a single platform and thereby more effectively thwart attacks.

The foregoing description of exemplary implementations provides illustration and description, but is not intended to be exhaustive or to limit the embodiments to the precise form disclosed. Modifications and variations are possible in light of the above description or may be acquired from practice of the embodiments.

For example, in the implementations described with respect to FIG. 3, ECRP system 130 was described as being located "in the cloud" and available via a SaaS model. In other implementations, ECRP system 130 may be provided/located at an enterprise's premises. In either case, security managers, such as a CISO, and a security operational team may access ECRP 130 (e.g., remotely or directly) to obtain the desire cyber security information.

In addition, features have been described above as allowing network personnel, such as a CISO, to interact with ECRP system 130. It should be understood that any user or party authorized to access ECRP system 130 may interact with ECRP system 130 to obtain information of interest. In some implementations, the level of information obtained by each user may be based on his/her position within or outside the enterprise. For example, a security manager may be able to obtain information regarding his/her department, whereas a C-level executive may be able to obtain information regarding all portions of the enterprise.

Still further, implementations described herein refer to ECRP system 130 providing a single platform/location for managing cyber security, risk management and resource planning. In some implementations, ECRP system 130 may provide such functionality to various parties spread out over multiple locations via multiple ECRP systems 130 accessed via multiple ECRP system agents.

In addition, features have been described above with respect to particular user interfaces, reports, logic, etc. In other implementations, different user interfaces, reports, logic, etc., may be provided based on the particular enterprise requirements.

Further, while series of acts have been described with respect to FIGS. 5 and 7, the order of the acts may be different in other implementations and other acts may also be possible. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

The foregoing description of exemplary implementations provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A system, comprising:
   a memory configured to store security policies and procedures associated with an enterprise, wherein the security policies and procedures comprise at least one of device information or policy information identifying actions associated with protecting assets of the enterprise and procedure information identifying actions to be performed by personnel to protect the assets of the enterprise;
   at least one device comprising at least one processor, wherein the at least one device is configured to:
   monitor enterprise activity associated with a plurality of devices associated with the enterprise in accordance with the security policies and procedures stored in the memory,
   determine, based on the monitored enterprise activity, whether the enterprise is complying with the security policies and procedures stored in the memory,
   calculate a risk exposure metric for a plurality of the assets of the enterprise based on the monitored enterprise activity and whether the enterprise is complying with the stored security policies and procedures,
   output, to a display, information identifying the risk exposure metric associated with at least some of the plurality of the assets, and
   generate a plan identifying actions to be taken by the enterprise to reduce the risk exposure metric associated with at least some of the plurality of the assets.

2. The system of claim 1, wherein when outputting information identifying the risk exposure metric, the at least one device is further configured to:
   output an overall risk exposure metric associated with the plurality of assets.

3. The system of claim 1, wherein the at least one device is further configured to:
   output, to the display, the plan.

4. The system of claim 1, wherein the at least one device is further configured to:
   calculate, based on the monitored enterprise activity, a threat score associated with at least one security threat; and
   output, via the display, the threat score.

5. The system of claim 4, wherein the at least one security threat comprises a plurality of security threats, and the at least one device is further configured to:
   generate a threat score for each of the plurality of security threats, and
   output, via the display, at least one of an overall threat score or the threat score for each of the plurality of security threats.

6. The system of claim 4, wherein when calculating the threat score associated with the at least one security threat, the at least one device is configured to:
   apply a score to the at least one security threat,
   identify mitigation-related actions performed by the enterprise with respect to the at least one security threat, and
   reduce the score for the at least one security threat based on the identified mitigation-related actions.

7. The system of claim 1, wherein the at least one device is configured to:
   obtain a second risk exposure metric for at least one of another enterprise or for an industry associated with the enterprise, and
   output, via a graphical user interface (GUI), a comparison of the risk exposure metric for the enterprise and the second risk exposure metric.

8. The system of claim 1, wherein the at least one processor is further configured to:
   provide, via a graphical user interface (GUI), a selectable input to allow a user to change the risk exposure metric for a first one of the plurality of the assets, receive, via the selectable input, a change to the risk exposure metric for the first asset, and generate a second plan to achieve the change to the risk exposure metric for the first asset.

9. The system of claim 8, wherein the at least one processor is further configured to indicate, via information output to the display, at least one of deployment of additional resources for the enterprise or a change in the security policies and procedures for the enterprise to achieve the change to the risk exposure metric.

10. The system of claim 1, wherein the at least one device is further configured to:

receive an input, by a person associated with monitoring the enterprise, identifying a new security threat, and automatically generate, in response to receiving the input, a new risk exposure metric for at least one of the plurality of assets.

11. The system of claim 1, wherein the at least one a processor is further configured to:

identify at least one activity associated with the enterprise to be performed, and calculate an expected reduction in the risk exposure metric for at least one of the plurality of assets if the at least one activity is performed.

12. The system of claim 1, wherein the at least one processor is further configured to:

identify at least one of areas or departments associated with the enterprise that are not adequately complying with the stored security policies and procedures, and automatically transmit a communication in response to the identified at least one of areas or departments that are not adequately complying with the stored security policies and procedures.

13. The system of claim 1, wherein the at least one device is further configured to:

identify security upgrades or changes that have not been performed based on the monitored enterprise activity.

14. The system of claim 1, wherein the at least one processor is further configured to:

allow a user associated with monitoring aspects of the enterprise to generate customizable displays associated with monitoring the enterprise's compliance with the security policies and procedures.

15. A method, comprising:

monitoring, via a security monitoring system, enterprise activity in accordance with security policies and procedures stored in a memory, wherein the security policies and procedures comprise at least one of device information or policy information identifying actions associated with protecting assets of the enterprise and procedure information identifying actions to be performed by personnel to protect the assets of the enterprise;

determining, based on the monitored enterprise activity, whether the enterprise is complying with the stored security policies and procedures;

calculating a risk exposure metric for at least one asset of the enterprise based on the monitored enterprise activity and whether the enterprise is complying with the security policies and procedures;

outputting, to a display, information identifying the risk exposure metric associated with the at least one asset; and generating, by the security monitoring system, recommendations identifying actions to be taken by the enterprise to reduce the risk exposure metric.

16. The method of claim 15, wherein the at least one asset comprises a plurality of assets and wherein outputting information identifying the risk exposure metric further comprises:

outputting an overall risk exposure metric associated with the plurality of assets.

17. The method of claim 15, further comprising:

calculating, based on the monitored enterprise activity, a threat score associated with at least one security threat; and outputting, via the display, the threat score.

18. The method of claim 17, wherein the at least one security threat comprises a plurality of security threats, the method further comprising:

generating a threat score for each of the plurality of security threats; and outputting, via the display, the threat score for each of the plurality of security threats.

19. The method of claim 15, further comprising:

providing, via a graphical user interface (GUI), a selectable input to allow a user associated with monitoring the enterprise to change the risk exposure metric for the at least one asset;

receiving, via the selectable input, a change to the risk exposure metric; and generating the recommendations associated with the enterprise to achieve the change to the risk exposure metric.

20. The method of claim 15, further comprising:

receiving, by a person associated with monitoring the enterprise activity, an input identifying a new security threat; and automatically generating, in response to receiving the input, a new risk exposure metric for the at least one asset.

21. The method of claim 15, further comprising:

identifying at least one activity associated with the enterprise to be performed, wherein the at least one activity is to be performed by personnel associated with the enterprise; and calculating an expected reduction in the risk exposure metric for the at least one asset if the at least one activity is performed.

22. A non-transitory computer-readable medium storing instructions, which when executed by a processor, cause the processor to:

monitor enterprise activity associated with an enterprise in accordance with security policies and procedures stored in a memory, wherein the security policies and procedures comprise at least one of device information or policy information identifying actions associated with protecting assets of the enterprise and procedure information identifying actions to be performed by personnel to protect the assets of the enterprise;

determine, based on the monitored enterprise activity, whether the enterprise is complying with the stored security policies;

calculate a risk exposure metric for at least one asset of the enterprise based on the monitored enterprise activity and whether the enterprise is complying with the security policies;

output, to a display, information identifying the risk exposure metric associated with the at least one asset; and
generate recommendations identifying actions to be taken by the enterprise to reduce the risk exposure metric.

* * * * *